US006131013A

United States Patent [19]

Bergstrom et al.

[11] Patent Number: 6,131,013

[45] Date of Patent: Oct. 10, 2000

[54] METHOD AND APPARATUS FOR PERFORMING TARGETED INTERFERENCE SUPPRESSION

[75] Inventors: Chad Scott Bergstrom, Chandler; Jeffrey Scott Chuprun; John Eric Kleider, both of Scottsdale, all of Ariz.

[73] Assignee: Motorola, Inc., Schaumburg, Ill.

[21] Appl. No.: 09/016,030

[22] Filed: Jan. 30, 1998

[51] Int. Cl.$^7$ .................................................. H04Q 7/20

[52] U.S. Cl. ......................................... 455/63; 455/501

[58] Field of Search .......................... 455/63, 67.1, 67.3, 455/296, 226.1, 226.2, 226.3, 501, 504, 506; 375/285, 346, 347, 348, 350; 379/392, 406, 410, 416, 3; 381/317, 318, 93, 71.1

[56] References Cited

U.S. PATENT DOCUMENTS

| | | | |
|---|---|---|---|
| 4,027,264 | 5/1977 | Gutleber | 455/306 |
| 5,159,711 | 10/1992 | Ma et al. | 455/266 |
| 5,307,379 | 4/1994 | Bergstrom et al. | 375/76 |
| 5,410,750 | 4/1995 | Cantwell et al. | 455/307 |
| 5,590,418 | 12/1996 | Holoubek et al. | 455/126 |
| 5,606,729 | 2/1997 | D'Amico et al. | 455/67.1 |
| 5,646,964 | 7/1997 | Ushirokawa et al. | 375/346 |
| 5,659,584 | 8/1997 | Uesugi et al. | 375/347 |
| 5,729,829 | 3/1998 | Talwar et al. | 455/63 |
| 5,881,094 | 3/1999 | Schilling | 375/202 |
| 5,933,768 | 5/1999 | Skold et al. | 455/296 |

FOREIGN PATENT DOCUMENTS

| | | | |
|---|---|---|---|
| 0453213 | 10/1991 | European Pat. Off. | H04B 15/00 |
| 9737457 | 10/1997 | WIPO | H04J 13/00 |

OTHER PUBLICATIONS

An article entitled "Wavelet Based Transmitter Identification", by Ralph D. Hippenstiel and Yalcin Payal, from International Symposium On Signal Processing and Its Applications, ISSPA, Gold Coast, Australia, Aug. 25–30, 1996. Organized by the Signal Processing Research Centre, QUT, Brisbane, Australia.

An article entitled "Non–Linear Filtering Techniques For Narrow–Band Interference Rejection In Direct Sequence Spread–Spectrum Systems", by T. Kasparis, M. Georgiopoulos and E. Payne, MILCOM, IEEE, 1991.

An article entitled "Spread Spectrum Signals With Low Probablility of Chip Rate Detection", by David E. Reed and Mark A. Wickert, from IEEE Journal On Selected Areas in Communications, vol. 7, No. 4, May 1989.

An article entitled "Complex Arithmetic Processor Performance Metrics on LPI Waveforms (U)" by Susan Gilfeather and Scott Chuprun, Motorola Government and Space Technology Group, Nov. 1995.

An article entitled "A Modulation Classifier For Multi Channel Systems And Multi Transmitter Situations", by Peter A.J. Nagy, from IEEE, 1994.

An article entitled "Modulation Classification Using a Neural Tree Network", by K.R. Farrell and R.J. Mammone, from 1993 IEEE.

(List continued on next page.)

*Primary Examiner*—William G. Trost
*Assistant Examiner*—Jean A. Gelin
*Attorney, Agent, or Firm*—John C. Scott; Frank J. Bogacz

[57] ABSTRACT

The invention relates to a communication system (300) having a receiver (304) that is capable of performing targeted interference suppression. An interference classifier (314) within the receiver (304) analyzes a signal received from a channel (306) and identifies and classifies interference components within the signal. An interference suppressor (316) then suppresses the interference components in the signal based on interference type. In one embodiment, the interference suppressor (316) includes a plurality of interference suppression modules that are each optimal for suppressing certain interference types. The interference suppressor (316) selects one of the interference suppression modules based on the type of interference present in the received signal. In another embodiment, a hybrid interference mitigation system (10) is provided by combining targeted interference suppression, frequency hopping adaptation, and processing gain adaptation.

42 Claims, 14 Drawing Sheets

OTHER PUBLICATIONS

An article entitled "Performance Analysis Of Interference Excisions In Spread Spectrum Communications Based On Instantaneous Frequency Estimation", by Chenshu Wang and Moeness G. Amin, from International Symposium On Signal Processing And Its Applications, ISSPA, Gold Coast, Australia, Aug. 25–30, 1996. Organized by the Signal Processing Research Centre, QUT, Brisbane, Australia.

An article entitled "Adaptive Subband Transforms In Time–Frequency Exisers For DSSS Communications Systems" by Mehmet V. Tazebay and Ali N. Akansu from 1995 IEEE.

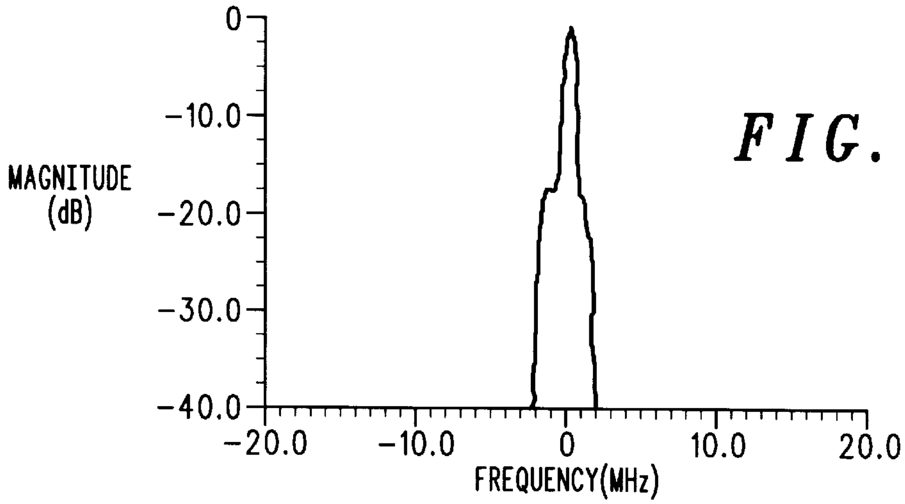
FIG. 11
FIG. 12
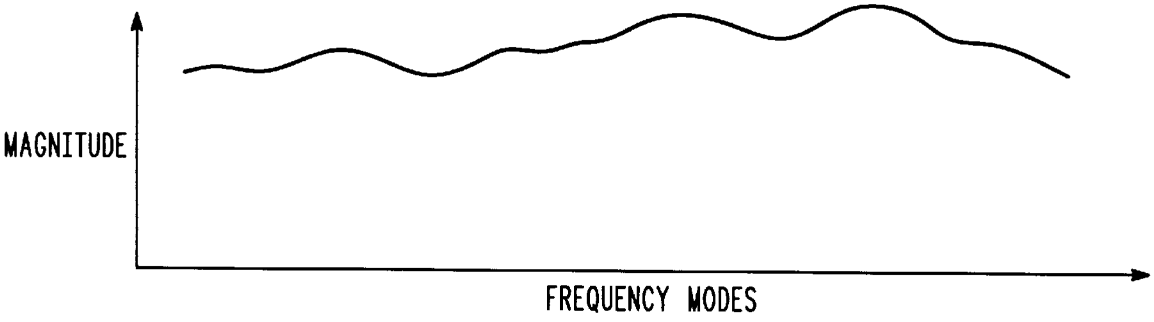
FIG. 13
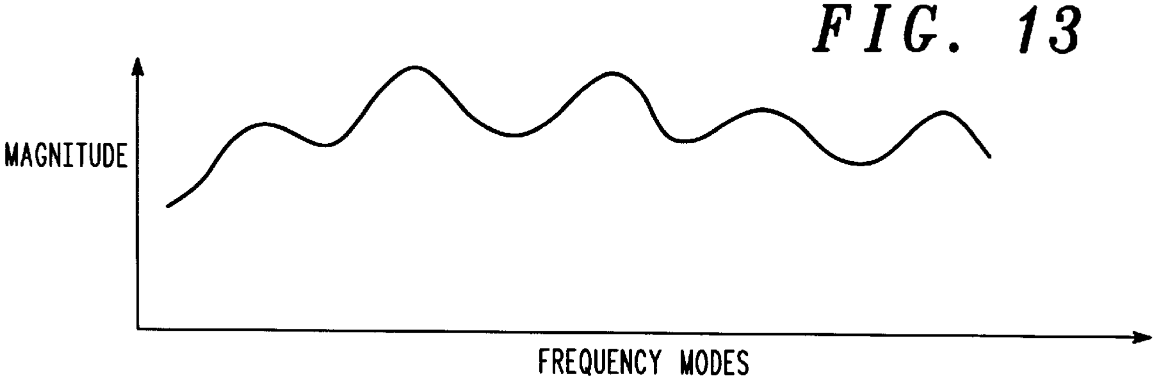

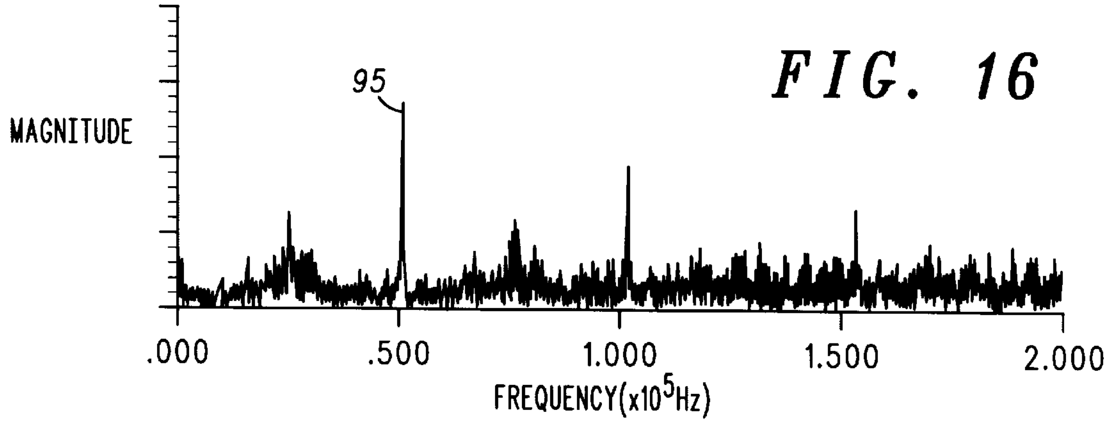
FIG. 16
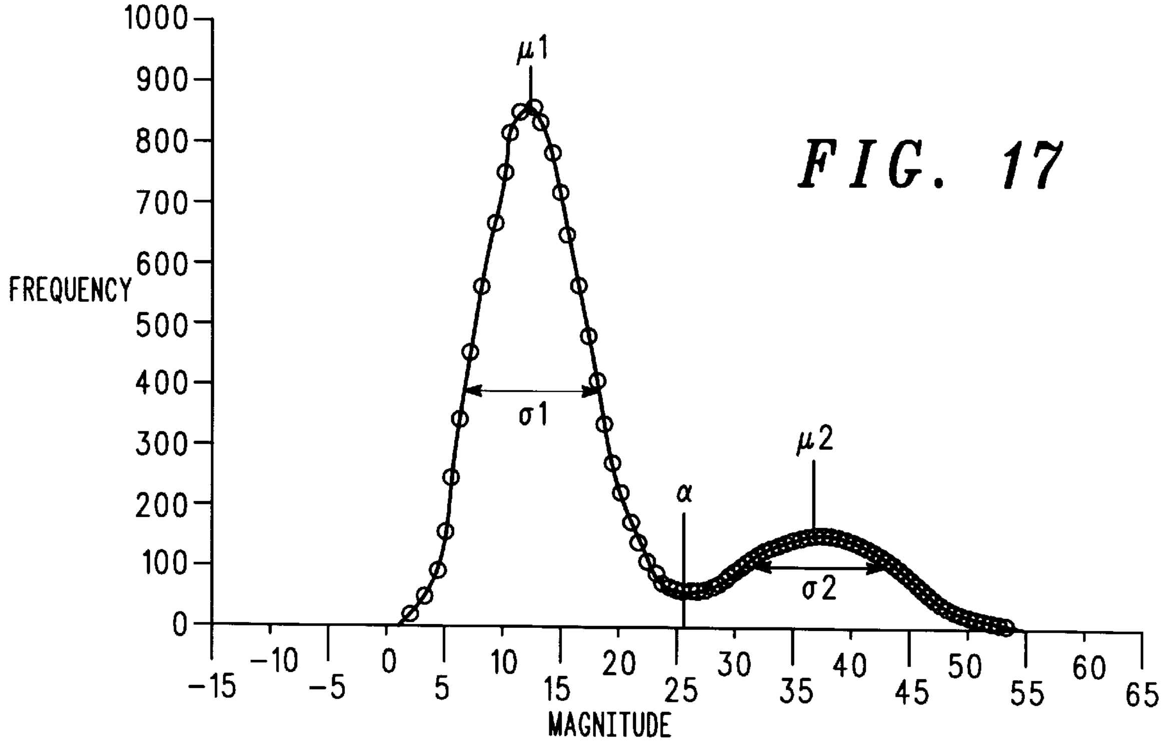
FIG. 17
FIG. 19
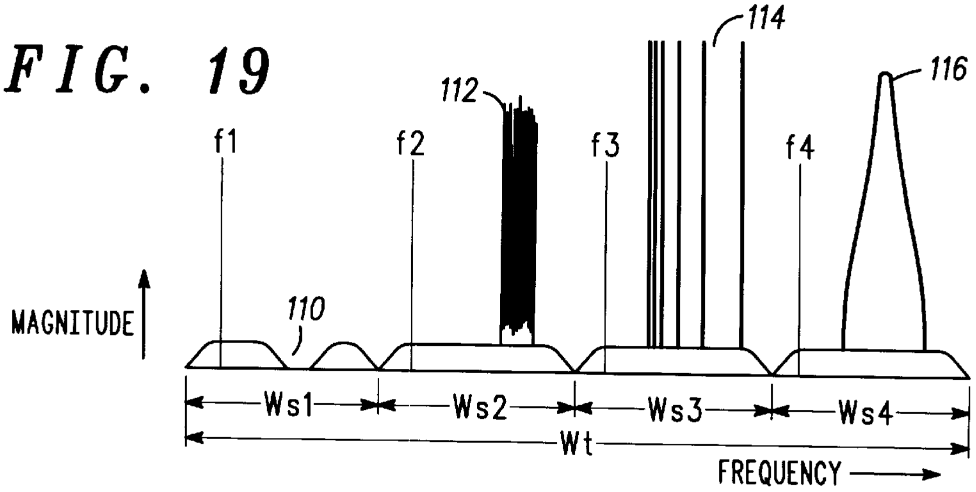

METHOD AND APPARATUS FOR PERFORMING TARGETED INTERFERENCE SUPPRESSION

FIELD OF THE INVENTION

The invention relates in general to communications systems and, more particularly, to communications systems having interference suppression capabilities.

BACKGROUND OF THE INVENTION

Digital cellular communications systems, paging systems, land mobile radio, and mobile battlefield communication systems are called upon to operate effectively in increasingly adverse spectral environments. Obstacles to digital mobile communications include non-stationary co-site interference, ambient communication signals, and hostile jamming interference. Typical interference levels can be very high, especially in a tactical environment, and can often exceed the desired signal by 60 decibels or more. Such levels overwhelm the operational capabilities of current tactical and commercial radio systems. Furthermore, PCS, paging, and cellular communication networks that incorporate spread-spectrum technologies, such as CDMA, increasingly face capacity limitation caused in part by growing spectral clutter. The presence of ambient high power partialband and narrowband signals often precludes frequency reuse by spread-spectrum communication systems.

Therefore, there is a need for a method and apparatus for reducing the impact of undesirable spectral components in a communications system.

BRIEF DESCRIPTION OF THE DRAWINGS

FIGS. 7–11 are graphs illustrating a method for performing preclassification filtering in accordance with one embodiment of the present invention;

FIGS. 12 and 13 are cross-sections of feature plane signal transformations illustrating the beneficial effects of using phase domain filtering;

FIG. 16 is a spectrum diagram illustrating a method for determining a baud rate for an FSK signal in accordance with one embodiment of the present invention;

FIG. 17 is a plot illustrating modal moment estimates for a data signal corrupted by a partial band noise jammer in accordance with one embodiment of the present invention;

FIG. 19 is a spectrum diagram illustrating a number of bands WsN for use in frequency hopping in accordance with one embodiment of the present invention;

DETAILED DESCRIPTION OF THE DRAWINGS

The present invention relates to a communications system that is capable of reducing the impact of undesirable spectral components (e.g., noise, interference, and jamming) in a receive signal. The system includes an interference classifier for classifying each of the undesired spectral components (if any) by interference-type and an interference suppressor for suppressing the undesired interference components in the receive signal using one or more interference suppression methods that may be "targeted" to the specific type of interference. By targeting interference suppression by interference-type, a superior level of interference suppression performance is achieved as compared to prior art systems that use a common suppression method for all types of interference. In one embodiment of the invention, the interference classification and suppression functions are performed automatically.

The invention is capable of operating in real time on a short sample set, with power consumption that is within the capabilities of modern digital signal processors (DSP). In addition, the invention is capable of optimizing bit error rate (BER) performance given a variety of interferers without sacrifice of bandwidth or system capacity and, in some cases, can improve the bit error rate (BER) of a communications system by multiple orders of magnitude. The invention is of relatively low complexity and can be implemented using computationally efficient recognition/cancellation routines. In one embodiment, the invention is used to provide for frequency reuse in a situation where a spread spectrum communications system is overlaying one or more narrowband and/or partialband systems.

As described in more detail below, the principles of the present invention can be, and preferably are, implemented in a spread spectrum communications system. A spread spectrum communications system is a system where the bandwidth of the transmitted radio frequency signal is wider than that required by the data rate and modulation type of the underlying information signal. That is, a second layer of modulation is used that "spreads" the spectrum of the modulated information signal to provide a number of important advantages. For example, spread spectrum systems are generally better at rejecting interference than are other types of communications systems. In addition, spread spectrum systems can support the use of code division multiple access (CDMA) techniques to provide a plurality of separate communication channels in a given bandwidth. Another advantage of spread spectrum techniques is that they are conducive to signal hiding in secure communications applications. Spread spectrum systems are also capable of high resolution ranging. Various methods, such as direct sequence spread spectrum (DSSS) and frequency hopping spread spectrum (FHSS), can be used to spread the bandwidth of the transmit signal.

Figure 1:
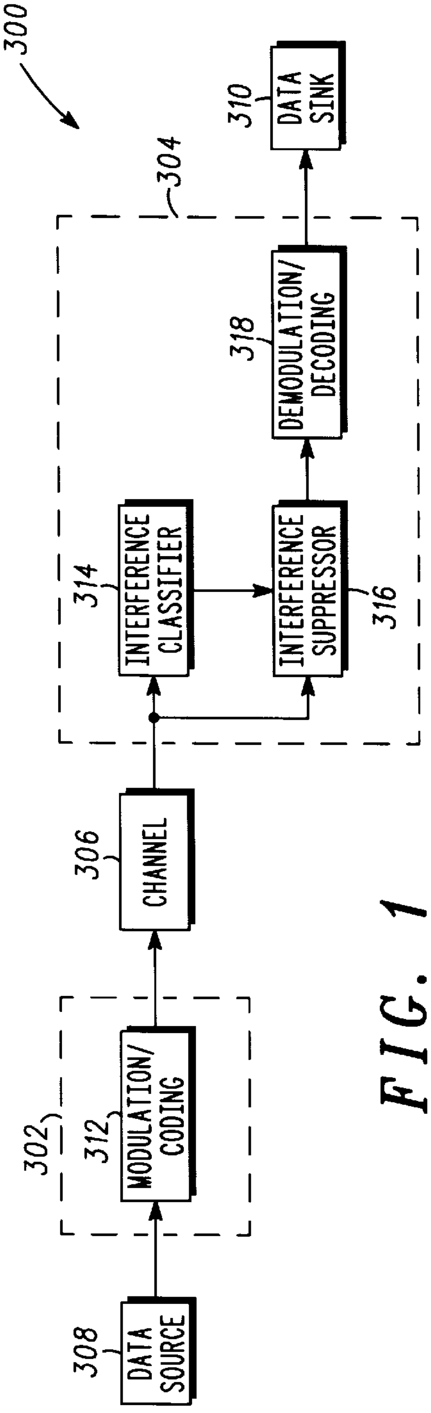
FIG. 1 is a high level block diagram illustrating a communication system in accordance with one embodiment of the present invention.

FIG. 1 is a high level block diagram illustrating a system 300 in accordance with one embodiment of the present invention. As illustrated, the system 300 includes a transmitter 302 which communicates with a receiver 304 through a channel 306. The transmitter 302 receives data from a data source 308 and processes the data to create a transmit signal that is delivered to the channel 306. The receiver 304 receives a signal from the channel (which is a modified form of the transmit signal) and processes the signal to recover the original data. The recovered data is then delivered to the data sink 310.

The transmitter 302 includes, among other things, a modulation/coding unit 312 that applies modulation and/or coding to the data from the data source 308. For example, the modulation /coding unit 312 can apply source coding, channel coding, interleaving, and/or upconversion to the data signal. In a spread spectrum system, the modulation/coding unit can also apply signal spreading to the signal using methods that are well known in the art.

The receiver 304 includes an interference classifier 314, an interference suppressor 316, and a demodulation/decoding unit 318. The receiver 304 receives the signal from the channel 306 in a signal receptor (not shown), such as an antenna. The interference classifier 314 analyzes the signal received from the channel 306 and identifies and classifies interference components within the signal. The interference components can be from any of a number of different sources, such as nearby communications systems and/or hostile entities attempting to jam transmissions from the transmitter 312. The interference classifier 314 outputs a signal indicative of the interference classification of each of the identified interference components. The interference suppressor 316 receives both the classification signal from the interference classifier 314 and the signal received from the channel 306. The interference suppressor 316 then selects one or more suppression methods that work best for the types of interference identified and uses the selected methods to suppress interference in the receive signal. After the interference components have been suppressed, the receive signal is transferred to the demodulation/decoding unit 318 to remove all modulation and/or coding from the signal. The signal is then delivered to the data sink 310.

Figure 2:
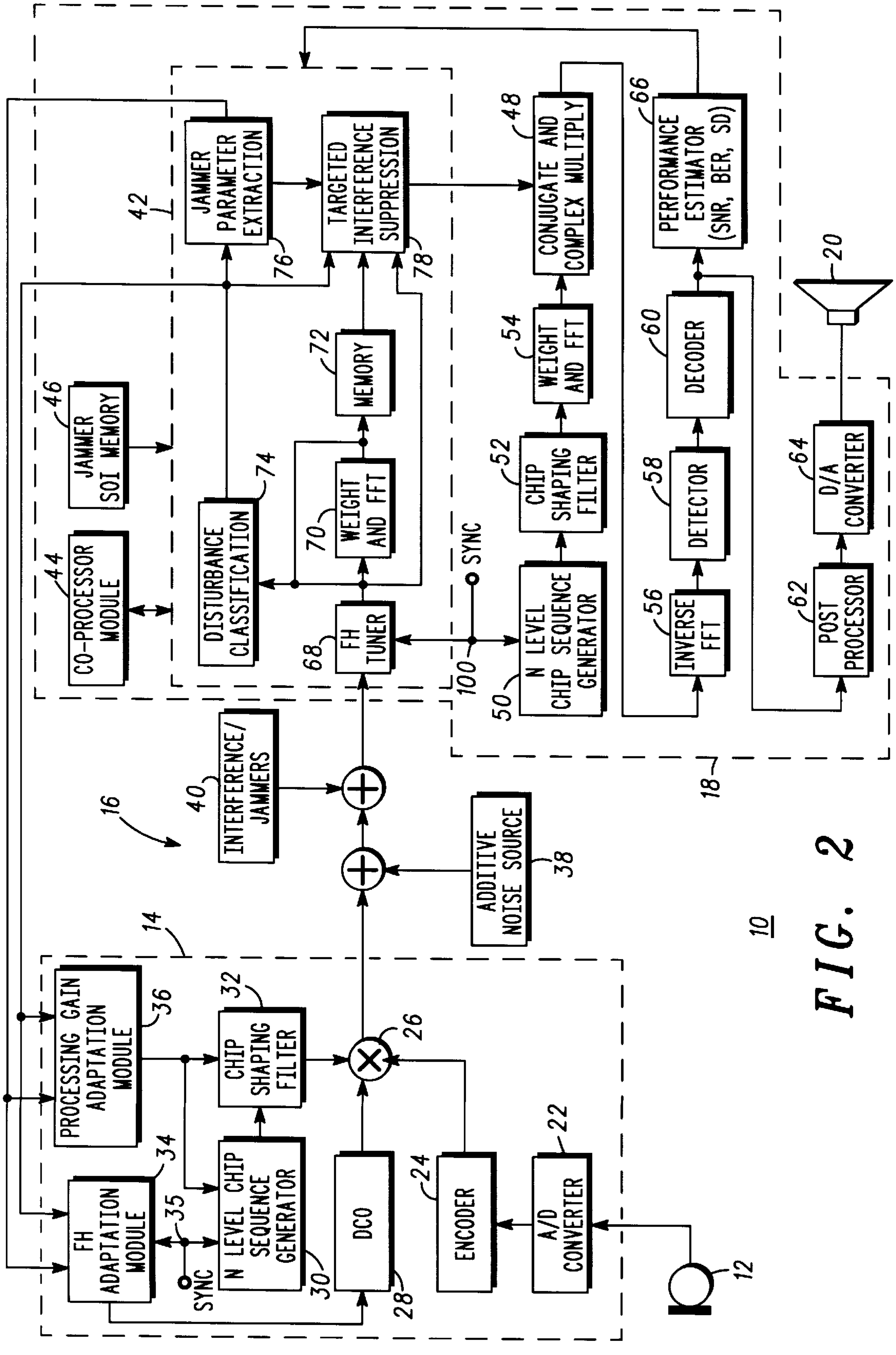
FIG. 2 is a block diagram illustrating a communication system in accordance with another aspect of the present invention.

FIG. 2 is a more detailed block diagram illustrating a spread spectrum communications system 10 in accordance with one embodiment of the present invention. As illustrated, the system 10 includes an input device 12, a transmitter 14, a channel 16, a receiver 18, and an output device 20. The transmitter 14 receives an input signal from the input device 12 and processes the signal into a form for transmission into the channel 16. The channel 16 carries the signal from the transmitter 14 to the receiver 18. Receiver 18 processes the signal received from the channel to recover the original information that was generated by the input device 12. This recovered information is then transferred to the output device 20.

The input device 12 can include virtually any type of information source. That is, the input device 12 can provide, for example, audio information (such as speech), computer data, or video information. In the illustrated embodiment, input device 12 comprises a microphone for converting speech into an analog electrical signal indicative thereof.

The transmitter 14 includes: analog to digital (A/D) converter 22, encoder 24, multiplier 26, digitally controlled oscillator (DCO) 28, N level chip sequence generator 30, chip shaping filter 32, frequency hopping (FH) adaptation module 34, and processing gain adaptation module 36. A/D converter 22 is operative for digitizing the analog signal from the input device. That is, the A/D converter 22 samples the analog signal from the input device 12 and creates digital values (i.e., samples) that are each indicative of the magnitude of the analog signal at a particular instant in time (i.e., the sampling time). It should be appreciated that an A/D converter 22 is only necessary if the input device 12 is providing analog input. The encoder 24 receives the digital signal from the A/D converter 22 and encodes it using any of a number of different digital encoding methods such as, for example, differential phase shift keying (DPSK), minimum shift keying (MSK), quaternary phase shift keying (QPSK), and quadrature amplitude modulation (QAM). Multiplier 26 receives the encoded data signal from encoder 24 and multiplies the signal with a radio frequency (RF) carrier signal and a pseudo noise (PN) sequence to create the transmit signal that is transmitted into the channel 16. It should be appreciated that multiple layers of multiplication may be performed in the multiplier 26 to achieve the transmit signal using the three inputs.

Multiplication by the RF carrier signal upconverts the encoded data signal to an RF frequency range centered about the carrier frequency. DCO 28 generates the RF carrier signal in response to a digital control signal from the frequency hopping (FH) adaptation module 34 (and/or from the processing gain adaptation module 36). The N level chip sequence generator 30 and chip shaping filter 32 generate the pseudo noise (PN) sequence that is used to spread the transmit signal in frequency in a process known as direct sequence spread spectrum (DSSS). The N level chip sequence generator 30 produces a multi-level PN sequence in a manner that is well known in the art. The chip shaping filter 32 filters the PN sequence in a manner that insures low probability of intercept/low probability of detection (LPI/LPD). After filtering, the PN sequence exhibits a more Gaussian time domain distribution which makes hostile detection and parameter extraction more difficult. Further, the chip shaping filter 32 band limits the PN sequence to the channel, which reduces adjacent channel interference. Note that a preferred embodiment of the invention can include frequency hopping (FH) adaptation and processing gain (PG) adaptation in concert, exclusively, or no adaptation. Without FH or PG adaptation, no feedback path is required.

The FH adaptation module 34 is operative for implementing adaptive frequency hopping spread spectrum techniques in the system 10. The FH adaptation module 34 delivers a digital signal to DCO 28 instructing it to change the center frequency of the carrier signal based upon a frequency hopping sequence. By periodically changing center frequency, a number of advantages are obtained, such as increased resistance to jamming. In the preferred embodiment, the FH adaptation module 34 receives feedback from the receiver 18 which indicates, among other things, the type(s) and spectral location(s) of interference that currently exists in the channel 16. The FH adaptation module 34 can determine from the feedback signals received from the interference suppression processor 42 that a particular frequency hopping band is occupied by interference that is difficult and/or impossible to overcome. The FH adaptation module 34 can then remove that frequency band from the frequency hopping sequence via frequency masking. When it is determined that the frequency band is no longer in an unsatisfactory condition, the FH adaptation module 34 can again enter the frequency band into the frequency hopping sequence. In the preferred embodiment, both the FH adaptation module and the N level chip sequence generator 30 are synchronized by a sync signal 35 in a manner that is well known in the art.

The processing gain adaptation module 36 is operative for adaptively controlling the level of spreading that is imparted to the modulated carrier signal. In this regard, the processing gain adaptation module 36 delivers control signals to both the N level chip sequence generator 30 and the chip shaping filter 32 to set the level of spreading. Like the FH adaptation module 34, the processing gain adaptation module 36 receives feedback signals from the receiver 18 that are indicative of the type(s) and spectral location(s) of interference presently in the channel 16. The processing gain adaptation module 36 uses this information to determine an appropriate processing gain for the transmit signal in light of the identified interference. For example, if a narrow band interference signal is detected in the channel 16, the processing gain adaptation module 36 may decide to spread the modulated carrier an additional amount to further reduce the effect of the interfering signal. On the other hand, if little or no interference is detected in the channel 16, the processing gain adaptation module 36 may decide to reduce the level of processing gain (i.e., reduce spreading).

In a preferred embodiment of the present invention, the channel 16 is a wireless RF link. It should be appreciated, however, that the principles of the present invention can be implemented in communication systems having virtually any type of channel, including both wired and wireless channels. As illustrated in FIG. 2, the channel 16 includes an additive noise source 38 and a source of interference/jamming signals 40. Additive noise source 38 represents all sources of random noise in the channel 16. That is, additive noise source 38 includes, for example, sources of thermal noise, atmospheric noise, galactic noise, and others. Frequency selective fading or other types of fading can also occur in the channel 16. Interference source 40 represents the sources of all man-made interference in the channel 16. For example, interference source 40 can include partial band noise jammers, spread spectrum co-channel sources, wideband noise jammers, bauded co-site signal sources, chirp jammers, multitone jammers, non-bauded co-site signals, and others. Signals from both additive noise source 38 and interference source 40 combine with the transmit signal in the channel 16 to produce a modified signal. The modified signal is then received by the receiver 18.

The receiver 18 includes: interference suppression processor 42, co-processor module 44, jammer signal of interest (JSOI) memory 46, conjugate and complex multiply (CCM) unit 48, N level chip sequence generator 50, chip shaping filter 52, fast Fourier transform (FFT) unit 54, inverse FFT unit 56, detector 58, decoder 60, post processor 62, digital to analog converter (DAC) 64, and performance estimator 66. As will be described in more detail, the interference suppression processor 42 receives the modified signal from the channel 16 and suppresses the interference/jamming components therein using targeted interference suppression. Co-processor module 44 provides supplemental processing power (such as, e.g., to perform complex signal arithmetic) to the interference suppression processor 42 for increasing processing speed and thereby improving data throughput. JSOI memory 46 stores, among other things, a library of feature plane representations corresponding to different jamming and interference types that may be encountered in the channel 16. Interference suppression processor 42 uses the information stored in the JSOI memory 46 to identify and classify interference components in the receive signal. As will be described in more detail, the interference classifications are used by the interference suppression processor 42 to determine an appropriate form of interference suppression for the receive signal.

After the interference/jamming signals in the receive signal have been suppressed, the interference suppression processor 42 outputs the restored spread spectrum signal for despreading, demodulation, and decoding. Correlation of the output signal (i.e., to remove the pseudo noise modulation) is performed in the frequency domain (although other embodiments can use time domain correlation). The N level chip sequence generator 50 and the chip shaping filter 52 are operative for creating the same PN sequence that was created in the transmitter 14 by N level chip sequence generator 30 and chip shaping filter 32. Operation of the N level chip sequence generator 50 is synchronized using sync signal 100, which is a clock signal that is synchronized with the transmitter sync. signal, as will be familiar to those of skill in the art. The output of the chip shaping filter 52 is delivered to FFT unit 54 where it is converted to a frequency domain representation. Before conversion, the FFT unit 54 applies weighting to the pseudo noise sequence to reduce FFT edge effects.

CCM 48 receives the frequency domain output signal from the interference suppression processor 42 and the frequency domain PN information from FFT unit 54. The CCM 48 determines the complex conjugate of the data from the interference suppression processor 42 and then convolves this conjugate data with the frequency domain PN information. For reasons that are apparent to a person of ordinary skill in the art, a significant time uncertainty can exist between the PN sequence produced in the N level chip sequence generator 50 and chip shaping filter 52 and the PN sequence used to modulate the transmit signal in the transmitter 14. Use of frequency domain correlation in the receiver 18, rather than time domain correlation, provides significant computational savings when sample timing uncertainty is large. The convolved signal is delivered to inverse FFT 56 to be converted from a frequency domain representation to a time domain representation.

Detector 58 receives the time domain correlated data from the inverse FFT 56 and detects significant correlation energy to produce detected data. In the preferred embodiment of the invention, detector 58 uses ensemble integration to perform the detection function. That is, detector 58 combines the magnitude squared of the inverse FFT 56 output. At zero or negative signal to noise ratio (SNR) conditions, symbols must be combined in an ensemble fashion and compared to a noise based threshold. The threshold is computed and updated dynamically during non-transmission periods in order to maintain an apriori bit error rate (BER) relative to ambient noise. Further processing may also be performed to adjust threshold levels during minimal background interference conditions.

Following detection, the detected data is decoded and/or synthesized in decoder 60 to produce reconstructed data. Decoder 60 can perform adjustments to the multilevel code timing or phase in order to maximize the correlation peak of the signal. In this manner, the multi-symbol buffering nature of the detection process compliments blockwise, processor based frequency tuning offset correction methods, further improving correlation results. Decoder 60 produces in-phase and quadrature values from the detected data which are used to compute an instantaneous phase angle. The instantaneous phase angle is dealiased in the decoder 60 and decoding is performed via symbol based integration in order to produce the reconstructed data. The reconstructed data is then passed to the post processor 62 where operations such as adaptive post filtering enhancement or frequency de-emphasis may be performed, producing conditioned, reconstructed data. The conditioned reconstructed data is delivered to the DAC 64 where it is converted to an analog signal for output to output device 20.

Performance estimator 66 receives the reconstructed data from the decoder 60 and analyzes the data to calculate one or more performance metrics. These performance metrics are then transferred back to the interference suppression processor 42 for use in fine tuning the interference suppression function. In a preferred embodiment, signal to noise ratio (SNR), bit error rate (BER), and spectral distortion (SD) are used as performance metrics, although other metrics may also be used.

As described above, the interference suppression processor 42 is used to determine the type of interference that is present in the receive signal and to perform interference suppression on the signal based on the types of interference identified. The interference suppression processor 42 delivers signals back to the FH adaptation module 34 and the processing gain adaptation module 36 in the transmitter that are indicative of interference type and spectral location. Interference suppression processor 42 includes: frequency hopping tuner 68, FFT unit 70, signal memory 72, disturbance classification unit 74, jammer parameter extraction unit 76, and targeted interference suppression unit 78. Frequency hopping tuner 68 receives the receive signal and processes the signal based on the known frequency hopping sequence of the transmitter 14. Frequency hopping tuner 68 also receives sync signal 100 to aid in signal processing. Frequency hopping tuner 68 outputs a time domain data signal that includes both desired information from the transmitter 14 and noise/interference/jamming signals from the channel 16. In an alternate embodiment, frequency hopping is not performed in the transmit unit 14 or the receive unit 18 and the FH tuner 68 and the FH adaptation module 34 are not required.

The output signal from the frequency hopping tuner 68 is weighted (to minimize FFT edge effects) and processed in FFT unit 70 to convert it to a frequency domain representation. The frequency domain representation is then stored in the signal memory 72 for later use. Disturbance classification unit 74 receives both the frequency domain information from FFT unit 70 and the time domain information from the frequency hopping tuner 68 and uses the information to identify and classify the interference/jamming components in the input receive signal. Classification information from the disturbance classification unit 74 is then delivered to the jammer parameter extraction unit 76 which determines parameters describing the interference/jamming components based upon the classifications. That is, the parameter extraction method (i.e., the types of parameters that are extracted and the method of calculating them) that is used in the jammer parameter extraction unit 76 depends on the type of interference identified. By tailoring the parameter extraction method to the type of interference, the jammer parameter extraction unit 76 is able to determine signal characteristics that are specific to the interference (e.g., baud rate, bandwidth, deviation, etc.).

The targeted interference suppression unit 78 includes a library of software modules that are each capable of suppressing or removing undesired interference components from a subject signal. Each of the modules in the targeted interference suppression unit 78 works best with a particular type or class of interference/jamming. For example, one module may be best at suppressing spread spectrum co-channel signals while another is best at suppressing the effects of frequency selective fading. The targeted interference suppression unit 78 receives the classification output signal from the disturbance classification unit 74 and the parameter signals from the jammer parameter extraction unit 76 and uses this information to determine which module is best for suppressing the interference in the receive signal. If more than one type of interference is present in the receive signal, the targeted interference suppression unit 78 may choose more than one module to process the signal. After appropriate modules have been chosen by the targeted interference suppression unit 78, the unit 78 retrieves the frequency domain and/or time domain receive signal information from the signal memory 72 and processes it using the appropriate modules. After processing, targeted interference suppression unit 78 outputs a frequency domain spread spectrum signal having suppressed interference. This signal is processed in the remainder of the receiver unit 18, as described above, to produce a data signal which is delivered to output device 20.

As is apparent from the above description, the system 10 illustrated in FIG. 2 provides a hybrid system for interference mitigation. That is, three distinct mitigation subsystems (targeted interference suppression, FH adaptation and processing gain adaptation) are implemented to handle virtually any type of interference that can occur. The interference suppression processor 42 provides a receiver based preprocessor function for the removal of undesired jamming signals, effectively optimizing bit error rate performance without the sacrifice of bandwidth or system capacity. The interference suppression processor 42 targets narrow band and partial band jammers such as partial band noise jammers, spread spectrum co-channel signals, bauded co-site and ambient signals, chirp jammers, multitone jammers, and non-bauded co-site and ambient signals. The FH adaptation module 34 provides a supplementary means of interference mitigation via interference masking and/or randomization of signal errors. Processing gain adaptation module 36 provides additional anti-jam protection by means of chip rate adjustment. Chip rate adjustments are especially effective in the presence of wideband jammer or co-channel spread spectrum interference that cannot be canceled or suppressed via other methods. In applications where size, weight, power, and bandwidth limitations are important, such as handheld or manpack systems, the FH adaptation and processing gain adaptation components of the system 10 can be omitted. Such an omission removes the need for the FH adaptation module 34, the processing gain adaptation module 36, the feedback channel from the interference suppression processor 42, the frequency hopping tuner 68, and the digitally controlled oscillator 28 (which can be replaced by a single frequency oscillator).

The disturbance classification unit 74 processes the time and/or frequency domain receive signal data to produce a maximum likelihood estimate of the disturbance class superset and/or subset classes. Class supersets can include narrow band, partial band and wideband classes. Class subsets, on the other hand, can include single tone, multi-tone, swept tone, bauded communication signal, non-bauded communication signal, partial band noise, or wideband noise. Interference may also be classified by modulation type, such as, for example, FSK, NRZ-ASK, and BPSK modulation. The disturbance classification unit 74 can utilize any of a number of techniques to recognize jammer and/or interference signals. For example, the disturbance classification unit 74 can employ tree based classification, multi-layer perceptron classification (MLP), or other methods of classification.

Figure 3:
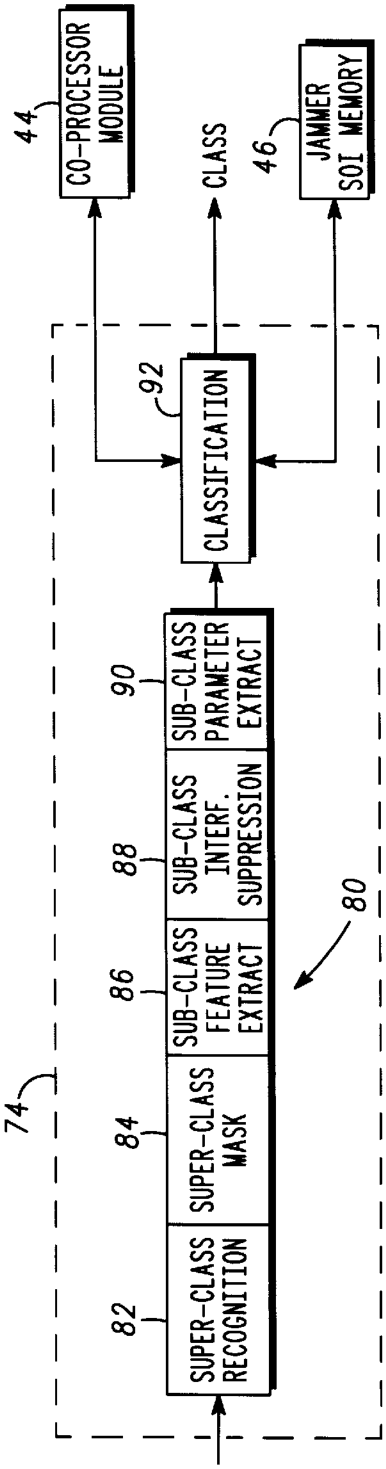
FIG. 3 is a block diagram illustrating elements within the disturbance classification unit 74 of FIG. 2.

FIG. 3 is a block diagram illustrating the disturbance classification unit 74 in one embodiment of the present invention. As illustrated, the disturbance classification unit 74 includes a feature extraction unit 80 and a classifier 92. The feature extraction unit 80 receives time domain and/or frequency domain representations of the receive signal and processes this data to derive certain features and parameters that are unique to the interference/jamming components within the receive signal. These features and parameters are then delivered to the classifier 92 for use in classifying the interference and jamming components. In the illustrated embodiment, the feature extraction unit 80 includes: super class recognition unit 82, adaptive super class masking unit 84, subclass feature extraction unit 86, subclass interference suppression unit 88, and subclass parameter extraction unit 90. Superclass recognition unit 82 is operative for deriving parameters that are useful in classifying the interference/jamming components according to superclass. The superclass masking unit 84 is operative for signal separation, for example, to separate FSK, ASK and PSK signals. The subclass feature extraction unit 86 performs feature plane transformations on the receive signal to aid in the classification of interference/jamming components based on subclass. Subclass interference suppression unit 88 is operative for SNR improvement for the isolated signal. Subclass parameter extraction unit 90 determines subclass parameters from the input data based on the features identified by the subclass feature extraction unit 86.

The classifier 92 receives the features and parameters determined in the feature extraction unit 80 and uses them to classify the interference/jamming components in the receive signal. To expedite the classification process and facilitate real-time operation, a separate co-processor module 44 can be utilized by the classifier 92 and block 80. As part of the classification process, the classifier 92 compares features and parameters determined by the feature extraction unit 80 to those of known interference/jamming types that are stored in the JSOI memory 46. Use of a JSOI memory 46 allows new interference types to be added to the system in a quick and efficient manner in contrast to prior art methods that are fixed, "hard wired" implementations. In one embodiment of the invention, a content addressable memory (CAM) is utilized to both store the known interference types and to perform the required comparisons. As is well known in the art, a CAM is capable of comparing an input signal to the contents of a plurality of memory locations simultaneously. The CAM then outputs a signal indicating all memory locations that include the input signal. The classifier 92 outputs a signal that is indicative of the type of interference in the receive signal. Such classification can include, but is not limited to, the following bauded and unbauded signals of interest:

Amplitude Modulation

PAM (Pulse Amplitude Modulation)
ASK (Amplitude Shift Keying)
Phase Modulation
M-ary PSK (Phase Shift Keying)
Offset M-ary PSK
PPM (Pulse Position Modulation)
Frequency Modulation
M-ary FSK (Frequency Shift Keying)
MSK (Minimum Shift Keying)
FDM/FM (Frequency Division Multiplexing/Frequency Modulation) (non-bauded)
Amplitude/Phase Modulation (AM/PM)
M-QAM (Quadrature Amplitude Modulation)

In one embodiment of the present invention, the superclass and subclass feature extraction and interference suppression functions are combined into a single unit and all recognition functions are performed by the disturbance classification unit 74.

In the preferred embodiment of the invention, the feature extraction unit 80 performs an efficient data analysis using circa 50 data transitions. For extremely low baud rates, feature extraction unit 80 also performs a feature accumulation function whereby features of contiguous signal sources are saved until sufficient data transitions have been accumulated for identification. In a preferred embodiment of the invention, a general-purpose set of classification parameters are computed by feature extraction unit 80. Classification parameters are computed in the feature extraction unit 80 using at least one of a plurality of feature plane transformations. In one embodiment, the feature plane transformations are computed from a joint time-frequency (JTF) matrix H of order n,m where n represents a contiguous time index and m represents a contiguous spectral index.

Figure 4:
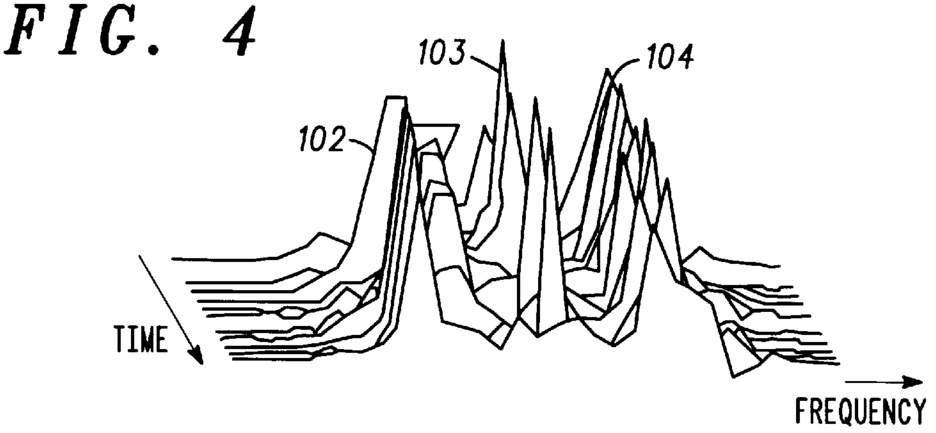
FIG. 4 is a joint time frequency (JTF) feature plane diagram illustrating inbound communication signal interferers versus time.

FIG. 4 illustrates a JTF feature plane showing three discrete interference components versus time. The first component 102 corresponds to an FSK signal, the second component 103 corresponds to an non return to zero (NRZ)-ASK signal, and the third component 104 corresponds to a PSK signal. JTF matrix H quantifies the information in the JTF graph. The JTF matrix can be represented as follows:

$$H = \begin{bmatrix} h(0,0) & h(1,0) & h(2,0) & \dots & h(m-1,0) \\ h(0,1) & \dots & \dots & & \dots \\ h(0,2) & & & & \\ \dots & \dots & \dots & & \dots \\ h(0,n-1) & \dots & \dots & & h(m-1,n-1) \end{bmatrix} \quad \text{Eq. 1}$$

The feature plane transformations are performed by using the JTF matrix H to compute a plurality of transformation matrices. The following are some transformation matrices, TN, that may be used in this regard (although other similar transformations can also be used):

Transformation Matrix 1

$$T1 = \begin{bmatrix} a(0,1) & a(0,2) & a(0,3) & a(0,m-1) \\ 0 & a(1,2) & a(1,3) & a(1,m-1) \\ 0 & 0 & a(2,3) & a(2,m-1) \\ \dots & \dots & \dots & \dots \\ 0 & \dots & \dots & a(m-2,m-1) \end{bmatrix} \quad \text{Eq. 2}$$

where $$a(I,J) = \frac{\sum_{i=0}^{n-1} h(I,i)h(J,i) - \left(\sum_{i=0}^{n-1} h(I,i)\right)\left(\sum_{i=0}^{n-1} h(J,i)\right) \Big/ n}{\left[\left(\sum_{i=0}^{n-1} h(J,i)^2 - \left(\sum_{i=0}^{n-1} h(J,i)\right)^2 \Big/ n\right) \left(\left(\sum_{i=0}^{n-1} h(I,i)^2 - \left(\sum_{i=0}^{n-1} h(I,i)\right)^2 \Big/ n\right)\right)\right]^{1/2}} \quad \text{Eq. 3}$$

Transformation Matrix 2

$$T2 = \begin{bmatrix} b(0,1) & b(0,2) & b(0,3) & b(0,n-1) \\ 0 & b(1,2) & b(1,3) & b(1,n-1) \\ 0 & 0 & b(2,3) & b(2,n-1) \\ \dots & \dots & \dots & \dots \\ 0 & \dots & \dots & b(n-2,n-1) \end{bmatrix} \quad \text{Eq. 4}$$

where $$b(I,J) = \frac{\left(\sum_{i=0}^{m-1} h(i,I)h(i,J) - \left(\sum_{i=0}^{m-1} h(i,I)\right)\left(\sum_{i=0}^{m-1} h(i,J)\right) \Big/ m\right)}{\left[\left(\sum_{i=0}^{m-1} h(i,J)^2 - \left(\sum_{i=0}^{m-1} h(i,J)\right)^2 \Big/ m\right) \left(\sum_{i=0}^{m-1} h(i,I)^2 - \left(\sum_{i=0}^{m-1} h(i,I)\right)^2 \Big/ m\right)\right]^{1/2}} \quad \text{Eq. 5}$$

Transformation Matrix 3

$$T3 = [p_1, p_2, p_3 \dots \mu_{m-1}], \text{ where } p_k = \max h(k,i)^2 \forall i \quad \text{Eq. 6}$$

Transformation Matrix 4

$$T4 = [\mu_0, \mu_1, \mu_2 \dots \mu_{m-1}], \text{ where } \mu_k = \text{mean } h(k,i)^2 \ \forall i \quad \text{Eq.}$$

Transformation Matrix 5

$$T5 = \begin{bmatrix} d(0,0) & d(1,0) & d(2,0) & \dots & d(m-1,0) \\ d(0,1) & \dots & \dots & & \dots \\ d(0,2) & & & & \\ \dots & \dots & \dots & & \dots \\ d(0,n-1) & \dots & \dots & & d(m-1,n-1) \end{bmatrix} \quad \text{Eq. 8}$$

where $d(I,J) = +1,\ h(I,J)^2 > c^* P_{\max}$ $d(I,J) = 0$, otherwise

Transformation Matrix 6

$$T6 = [\mu_0, \mu_1, \mu_2 \dots \mu_{m-1}], \text{ where } \mu_k = \text{mean } d(k,n) \ \forall n \quad \text{Eq. 9}$$

Transformation Matrix 7

In addition to the transformation matrices set out above, computationally efficient signal mapping methods are used in accordance with the present invention to generate unique stationary patterns in order to supplement classification, while eliminating carrier frequency offset errors. Since the exact carrier frequency is undetermined before the mapping procedure, a balanced multiplication is used in order to cancel the carrier components. Representing the input in-phase and quadrature signal samples as x(i) and y(i), and the transformation in-phase and quadrature samples as px(i) and py(i), the transformation is as follows:

$$px(j) = y(i+\tau)[y(i) - x(i)] + x(i+\tau)[x(i) + y(i)] \quad \text{Eq. 10}$$

$$py(j) = x(i+\tau)[x(i) - y(i)] + y(i+\tau)[y(i) + x(i)] \quad \text{Eq. 11}$$

where:

τ=delay, in samples i=1 to N j=1 to N −τ

For PSK signal formats, the desired delay τ is equal to the bit period. By up sampling to achieve a 10 to 1 oversampling, a close approximation to the desired delay can be obtained. Projection of the histogrammed polar space defined by the above transformation to a Cartesian space S gives the following transformation matrix which defines the unique signal signature, where L and Q are arbitrary integer constants corresponding to magnitude (L) and phase (Q) dimensions.

$$T7 = \begin{bmatrix} S(0,0) & S(1,0) & S(2,0) & \dots & S(Q-1,0) \\ S(0,1) & \dots & \dots & & \dots \\ S(0,2) & & & & \\ \dots & \dots & \dots & & \dots \\ S(0,L-1) & \dots & \dots & & S(Q-1,L-1) \end{bmatrix} \quad \text{Eq. 12}$$

T7 projections provide additional feature transformation data, as shown in Equations 13 and 14 below.

Transformation Matrix 8

$$T8 = [\mu_0, \mu_1, \mu_2 \dots \mu_{Q-1}], \text{ where } \mu_k = \text{mean } S(k,l) \ \forall l \quad \text{Eq. 13}$$

Transformation Matrix 9

$$T9 = [\mu_0, \mu_1, \mu_2 \dots \mu_{L-1}], \text{ where } \mu_k = \text{mean } S(q,k) \ \forall q \quad \text{Eq. 14}$$

For FSK signal formats, the desired delay τ is not necessarily equal to the bit period. The pattern is not stationary as in the PSK case where the pattern peaks remain relatively fixed in the phase coordinate dimension. The changing characteristic of the pattern structure for FSK formats can be used to distinguish signal formats that have phase slopes versus fixed phase states during the bit periods. This characteristic is made part of the signal descriptive vector and used to identify FSK formats. For pattern structures that change, phase derivative processing is used to derive a second signal pattern.

Figure 5:
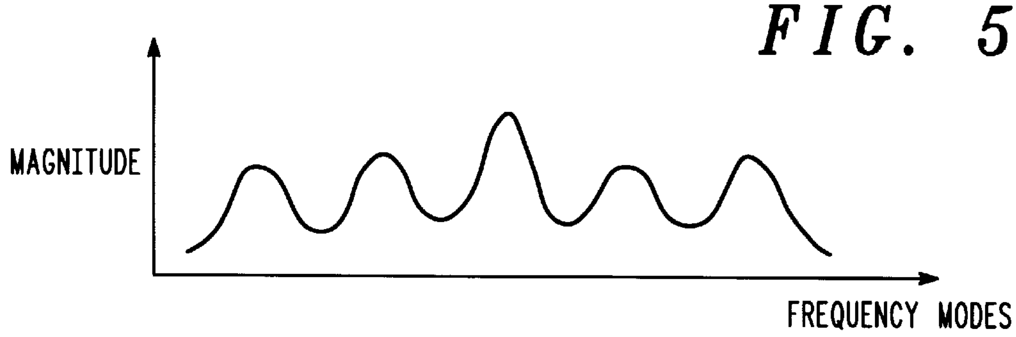
FIG. 5 is a cross section of a feature plane transformation diagram for a five FSK interference signal.

In order to obtain the optimum delay for a PSK signal, a baud rate estimate is employed. A delay of approximately one half bit, as estimated by the pre-filter process spectrum width determination, is used. The actual baud rate is determined by performing a spectrum analysis of the transform output. From this baud rate, the proper one bit delay time can be determined. Methods for baud rate calculation are discussed below. FIG. 5 illustrates a cross-section of a typical feature plane signal transformation for a five FSK interference signal, obtained using equations 10, 11, 12, and 13 above. It should be appreciated that the full feature plane transformation is a three dimensional representation and the two dimensional cross-section of FIG. 5 is presented for ease of illustration. Feature plane transformations, such as the one in FIG. 5, de-emphasize the random components of the signal and emphasize the invariant features, supporting accurate classification of signal type by producing a unique signal signature. Note that the transformation includes five distinct frequency modes that aid in identification of interference type. A plurality of feature plane transformations representing different interference types can be stored in the JSOI memory 46 for comparison with transformations derived from receive signals to classify interference components in the receive signals.

Since the signal processing required to perform the signal transformations includes non-linear processing, it is desirable to implement as much signal to noise ratio (SNR) improvement ahead of the signal processing as possible. In one embodiment of the invention, SNR improvement is performed before non-linear processing in the H transform domain, as well as after non-linear processing in the TN transform domain. It is highly desirable that the SNR improvement not distort the signal features that produce the pattern for signal recognition. Furthermore, it is desirable to separate co-existent signals in order to minimize feature aliasing. Two methods of SNR processing that can be employed are preclassification filtering and phase domain filtering. In the preferred embodiment of the present invention, both methods are used.

Figure 6:
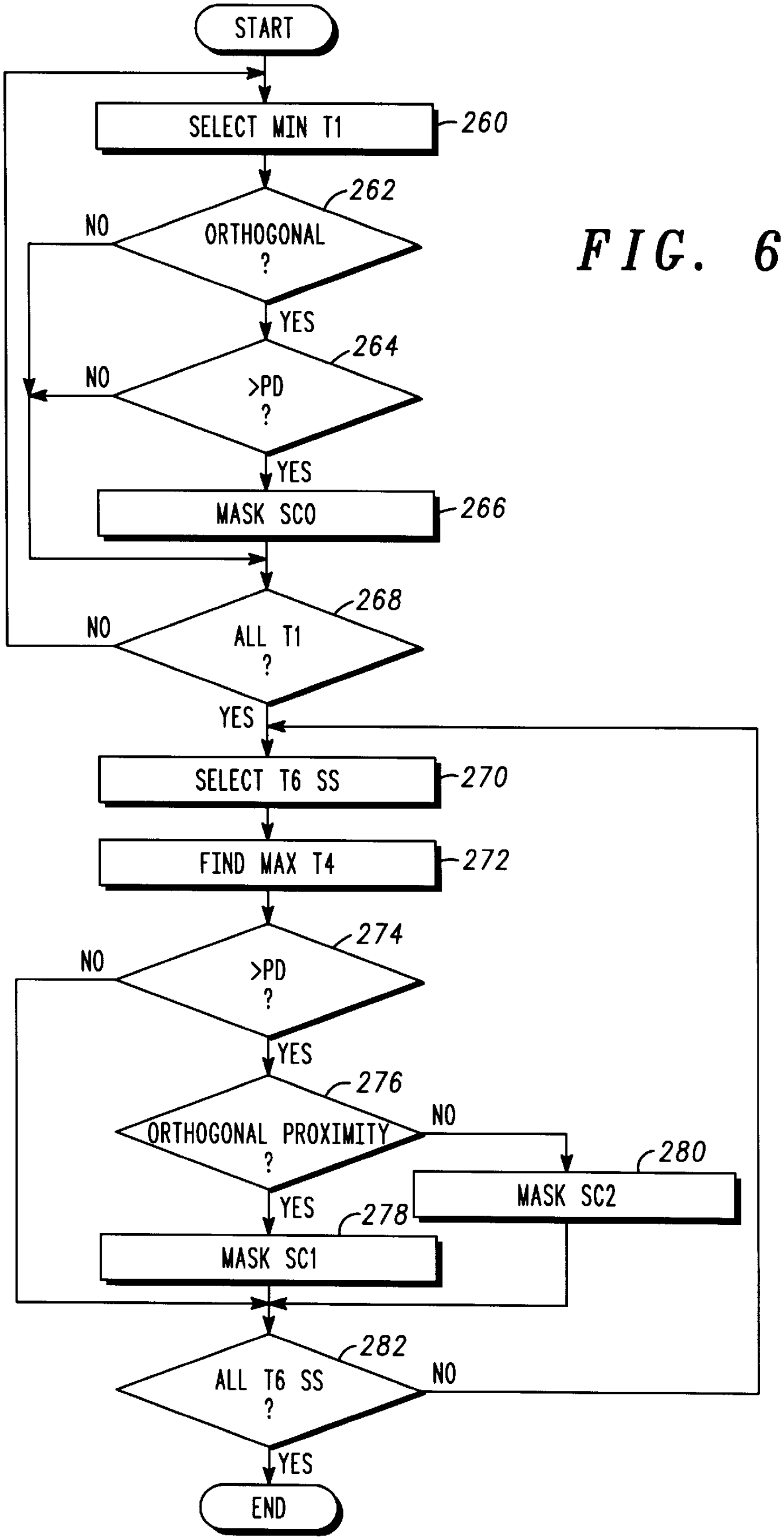
FIG. 6 is a flowchart illustrating a transformation masking method in accordance with one embodiment of the present invention.
Figure 8:
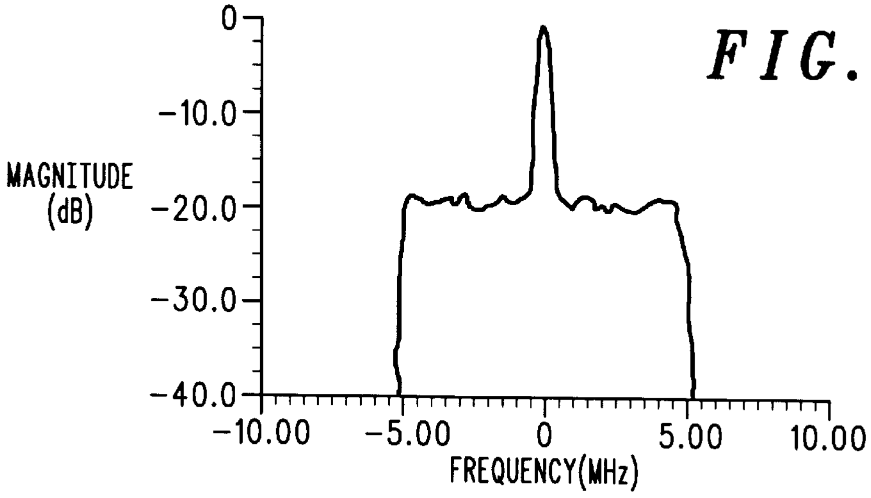

FIG. 6 is a flowchart illustrating a superclass classification and masking method to perform preclassification filtering in accordance with one embodiment of the present invention. Prior to the operations performed by FIG. 6, it is assumed that the H matrix and transformations T1 through T9 have been computed. Superclass classification begins with Select Min T1 260, which searches the array to produce the smallest correlation. Next, orthogonal 262 decision compares the value produced by Select Min T1 to an apriori negative constant to determine if a significant negative correlation is present. If so, decision block 264 examines T5 for detection. If detection is positive nonzero, Mask SC0 266 then determines signal bandwidth from T1 indices n and m, which represent the signal extent for Super Class O. As a further step, class SC0 may be confirmed by comparing the peak power from columns n and m for consistency. Finally, Mask SC0 266 filters the SC0 signal by zeroing the identified band, and stores the mask location to memory. Following consideration of all T1 (i.e., all SC0), the Superclass Classification continues with Select T6 SS 270, which examines the T6 transformation for near steady state (SS) values by comparison against an apriori constant. For SS T6, the maximum signal energy is determined from Find Max T4, which coarsely locates the center frequency of the candidate signal, producing a peak index. Next, decision block 274 examines T5 for detection. If detection is positive nonzero, Orthogonal Proximity 276 compares T1 (corresponding to the index from Find Max T4 and proximity indices) against a second apriori negative constant to determine if significant negative correlation is present. If so, then Mask SC1 determines the bandwidth of the signal bounded by the contiguous detected SS values about the max T4 index, and filters the SC1 signal by zeroing the identified band, and stores the SC1 mask location to memory. If significant negative correlation is not present, then Mask SC2 280 determines the bandwidth of the signal and filters the SC2 signal by zeroing the identified band, and stores the SC2 mask location to memory. Next, if all distinct steady state regions have been considered (i.e., all candidate signals within the analysis band), then all T6 SS 282 branches to End. In this discussion SC0 represents an FSK signal superclass, SC1 refers to bauded signal superclasses (e.g., PSK), and SC2 represents non-bauded continuous wave (CW) signals. The masking and classification process of FIG. 6 serves as preliminary signal separation and recognition prior to sub-class parameter extraction and final classification.

After signal separation and superclass classification, the following sub-class parameters may be computed, although others may also be appropriate:

| | | |
|---|---|---|
| 1 | Dynamic Range, | DR |
| 2 | Amplitude Modes, | AM |
| 3 | Amplitudes RMS, | AR |
| 4 | Discriminator Deviation, | DD |
| 5 | Phase Modes, | PM |
| 6 | Discriminator Mean, | DM |
| 7 | Outlier to Mean Ratio, | OM |
| 8 | Outlier to RMS Ratio, | OR |
| 9 | Baud Rate, | BR |
| 10 | Superclass, | SC |
| 11 | Frequency Bandwidth, | BW |
| 12 | Frequency Modes, | FM |
| 13 | Frequency Center, | FC |

Transformations T7, T8, and T9 may be used to compute mode information by tabulation of peak information, for example, using derivatives of filtered transformations. Alternatively, the modes may be determined in a similar fashion using filtered histograms of dealiased phase information, magnitude information, or discriminator output. Discriminator output also provides signal bandwidths and center frequencies. The above-described features provide sufficient information for classification into multiple signal types including, but not limited to: CW, FSK, MPSK, QPSK, MASK, and FM Unbauded. It should be appreciated that preclassification filtering can be used to perform functions other than signal separation.

Figure 7:
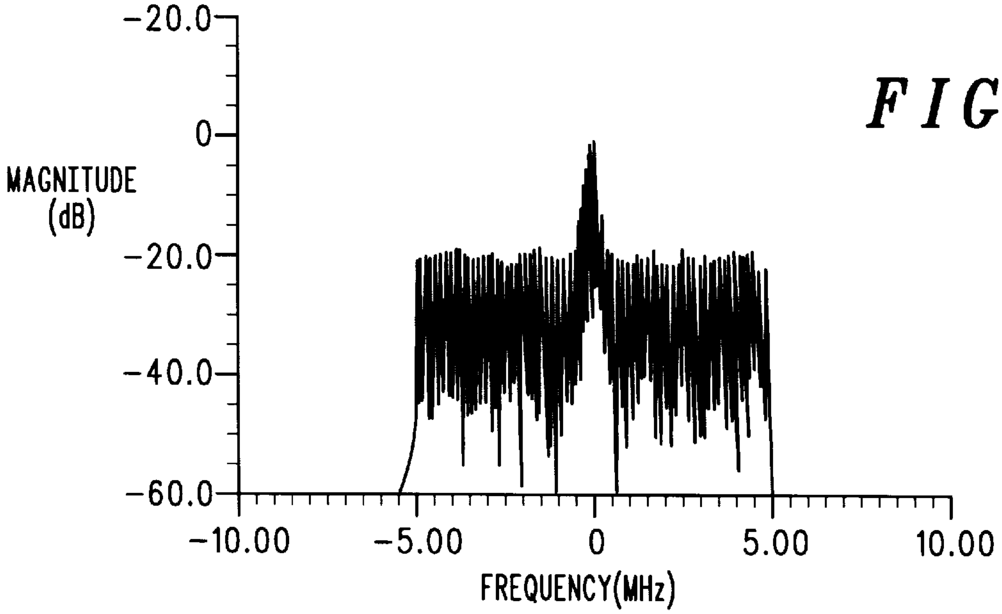
Figure 9:
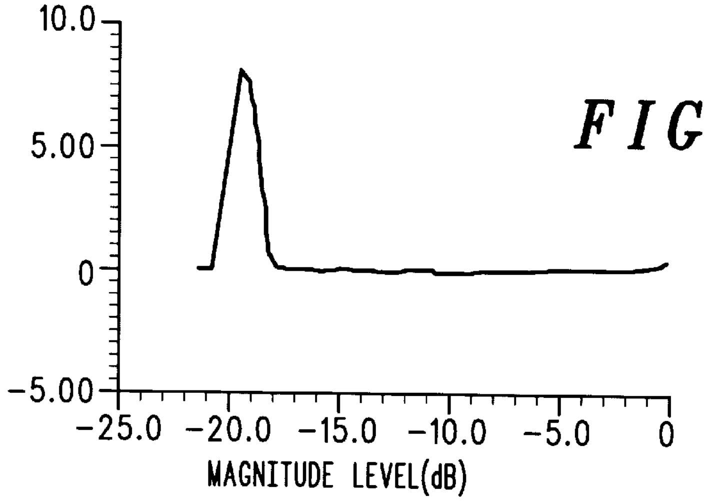
Figure 10:
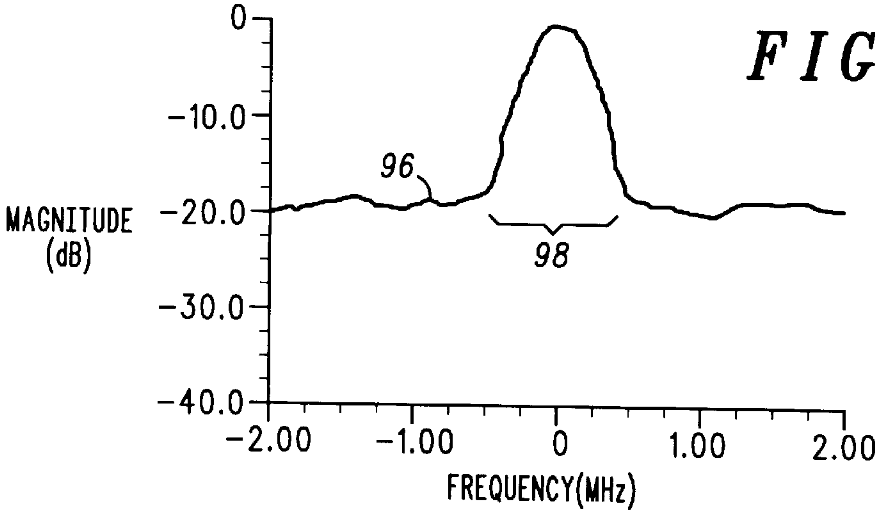

In one embodiment of the present invention, preclassification filtering is performed by isolating the narrow band interference signal of interest, estimating the bandwidth of the signal of interest, and prefiltering the signal of interest before classification functions are invoked. FIGS. 7–11 illustrate this method. First, as illustrated in FIG. 7, the signal of interest is converted into a frequency domain representation using a frequency transformation, such as a discrete Fourier transform (DFT) or a fast Fourier transform (FFT). The spectrum illustrated in FIG. 7 represents an MSK signal. The frequency coefficients found using the frequency transformation are converted to power spectrum and smoothed by a moving average filter, or similar device, to achieve the smooth spectrum illustrated in FIG. 8. The smooth spectrum is histogrammed, as illustrated in FIG. 9, to determine the noise floor level of the interference signal of interest (i.e., the peak of the histogram). Using the peak spectrum location from the histogram as the location of the signal noise floor 96, the signal bandwidth at the noise power level is measured as illustrated in FIG. 10 producing bandwidth 98. This width is corrected to a null-to-null bandwidth by assuming the signal spectrum shape as sin (x)/x and utilizing the peak SNR reference to determine where on the sin(x)/x curve the width was measured. FIG. 11 illustrates the spectrum of the MSK signal after the prefiltering operation.

As described previously, phase domain filtering is another technique that can be used to improve SNR before nonlinear processing. Phase domain filtering involves filtering the de-aliased phase components of the signal of interest using a moving average filter although other filter embodiments can also be used. The moving average filter that is used should possess sufficient bandwidth to prevent distortion of the signals of interest. In one embodiment of the present invention, a three point moving average filter was found to possess sufficient bandwidth. The following equation describes one embodiment of a discrete time averaging filter that may be used to perform phase domain filtering:

$$y(n) = \frac{1}{(M+1)}\sum_{m=0}^{M} x(n-m)$$

The moving average filter is preferably applied repeatedly to the signal of interest. Phase domain filtering has been found to be effective on FSK, MSK, and PSK signals. Use with other types of signals is also possible.

FIGS. 12 and 13 are cross-sections of feature plane signal transformations illustrating the beneficial effects of using phase domain filtering. FIG. 12 illustrates the T7 transform projection that is obtained using a five tone FSK signal at 1 dB SNR (after spectral excision interference suppression, as will be described shortly). Such a transform should display five distinct feature peaks. As illustrated in FIG. 12, these peaks are not present with enough signal power to discern the presence of the five tone FSK signal. FIG. 13 illustrates the feature plane transform for the same signal after phase domain filtering is applied. Note that the five distinct frequency peaks are clearly visible. As can be appreciated, use of the transformation illustrated in FIG. 13 significantly enhances the likelihood of proper signal classification. The phase domain filtering has effectively increased the SNR of the transform information by approximately 6 to 7 dB. Classification and baud rate procedures can then be used to process the improved transform. In order to overcome the noise enhancement effects introduced by derivative computation, phase domain filtering may be performed prior to application of the discriminator.

Figure 14:
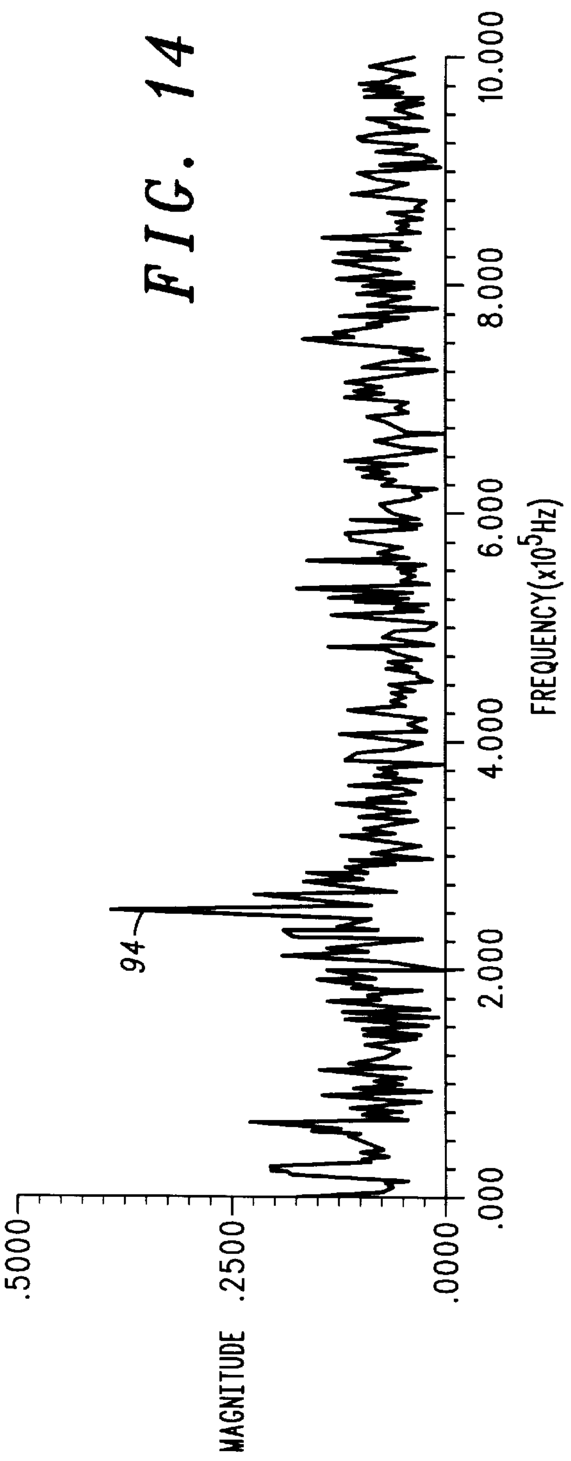
FIG. 14 is a spectrum diagram illustrating a method for determining a baud rate for a binary phase shift keying (BPSK) signal in accordance with one embodiment of the present invention.

As described previously, the baud rate of the interference signal of interest can be one of the extracted features that is delivered to the classifier 92 for use in classifying the signal of interest. In accordance with the present invention, methods are provided for determining the signal baud rate of the interfering signal of interest based on the modulation method of the signal of interest. That is, first it is necessary to determine the type of modulation being used (e.g., frequency modulation or phase modulation) and then a baud rate determination method is chosen based on modulation type. If an interfering signal of interest is found to have phase modulation, baud rates are determined by analyzing the frequency content of the T7 feature space of the signal of interest represented by equations 10 and 11. That is, first a T7 feature space transformation is found for the signal of interest and then the feature transformation is converted to a frequency domain representation using, for example, an FFT. The frequency domain representation is then analyzed to isolate a rate line corresponding to the baud rate. Even without prefiltering, a rate line can be detected at low SNRs (i.e., 0 db and below) using this method. FIG. 14 is a graph illustrating the spectrum of the T7 feature space of a BPSK signal at 0 dB SNR. Note that the rate line 94, corresponding to 250 kHz, is clearly visible in FIG. 14 and may be readily extracted by a simple search algorithm.

Figure 15:
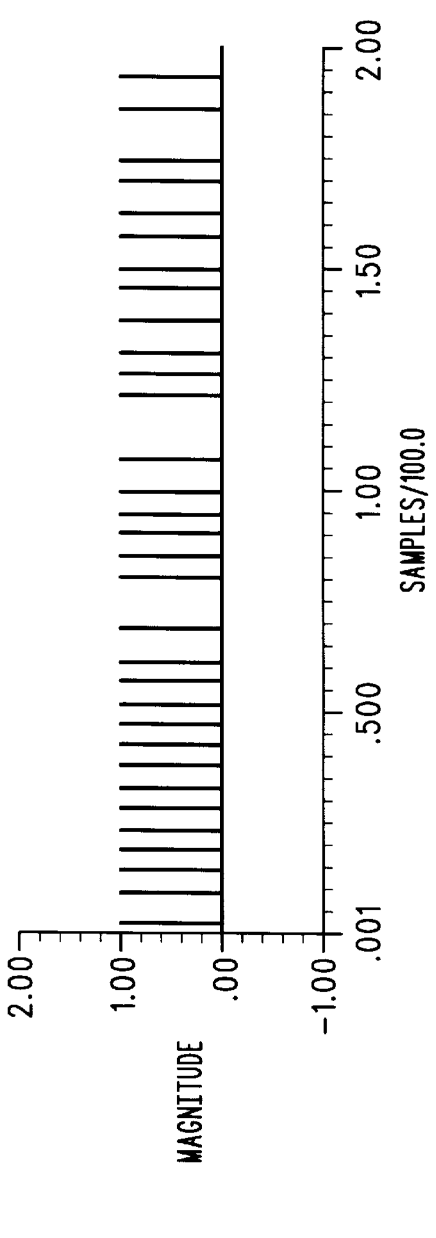
FIG. 15 illustrates a linear array of alternating Kronecker deltas that is used to determine a baud rate for an frequency shift keying (FSK) signal in accordance with one embodiment of the present invention.

For frequency modulation (FM) signals, a rate line may be established by observing the transitions in the T7 space. The transitions are used to generate a linear array of alternating Kronecker deltas as illustrated in FIG. 15 in connection with a five tone FSK signal. A frequency transformation of the transition sequence produces a frequency spectrum (see FIG. 16) that clearly indicates the desired baud rate line 95.

As described previously, the targeted interference suppression unit 78 includes a plurality of interference suppression modules that can be used to suppress interference/jamming components within the receive signal. In accordance with the present invention, a plurality of interference suppression techniques are provided that can be implemented as modules within the targeted interference suppression unit 78. These techniques are (1) the inverse whitening function technique, (2) the adaptive inverse weight technique, and (3) the adaptive excision technique. In addition to these interference suppression techniques, as described previously, the system 10 also provides frequency hopping adaptation and processing gain adaptation functionality to help it adapt to hostile spectral environments. The above techniques will now be described.

In a preferred embodiment of the invention, first and second order statistics of the receive signal spectrum are derived prior to application of interference mitigation methods. That is, non-arithmetic modal moment estimates are used to describe different "modes" in the spectrum. Each mode corresponds to a single component in the receive signal including the fundemental communication signal and interference components. Modal moment estimates avoid jammer induced power bias that can arise when using arithmetic estimates. Modal moment estimates also allow multimode spectra to be accurately described and ultimately suppressed. Modal mode estimates are also tolerant of wide dynamic range fluctuations.

FIG. 17 is a plot illustrating typical modal moment estimates for a data signal corrupted by a partial band noise jammer. The x axis of the plot represents the spectral magnitude of the receive signal. The y axis of the plot represents the frequency with which the receive signal achieved a particular magnitude. That is, the y axis is related to the number of samples in the input data that are within a particular magnitude range. As such, the plot represents a magnitude distribution for the frequency domain representation of the signal. As shown in FIG. 17, two modes are apparent from the plot. The first mode corresponds to the fundamental data signal (i.e., the desired information from the transmitter). The second mode corresponds to the partial band noise jammer. In accordance with one embodiment of the present invention, these two modes are described using modal estimates $\mu$ and $\sigma$, wherein $\mu$ is the mean magnitude and a is the magnitude standard deviation of the mode. An adaptive limit a can also be determined from the plot to describe a limitation point for the first mode. In a preferred embodiment of the present invention, the adaptive limit a for the fundamental data signal is equal to $k\sigma+\mu$, where k is a constant.

Figure 18:
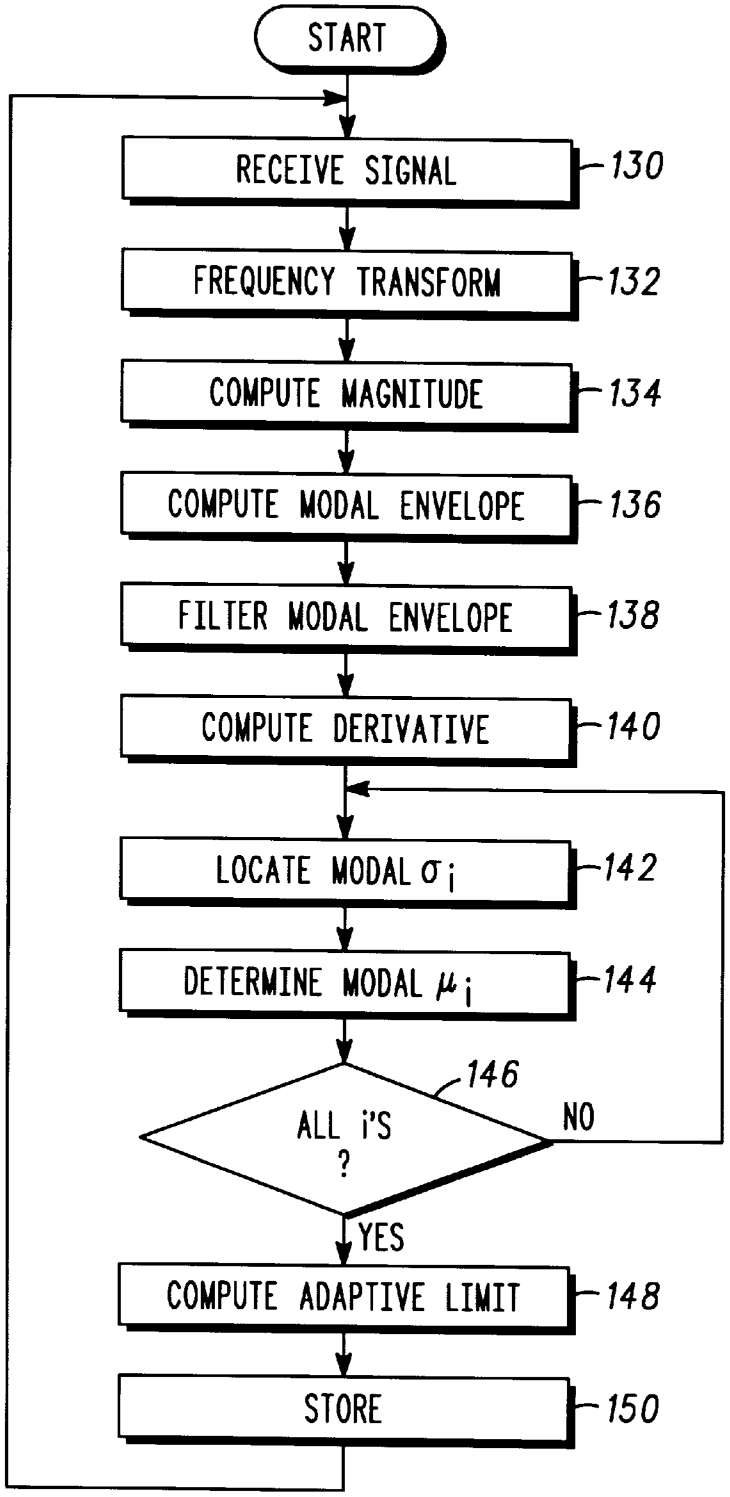
FIG. 18 is a flowchart illustrating a process for deriving modal moment estimates in accordance with one embodiment of the present invention.

FIG. 18 is a flowchart illustrating a process for deriving the modal moment estimates from the receive signal. A signal is first received from the channel (step 130). The receive signal is transformed to a frequency domain representation using a frequency transformation, such as an FFT (step 132). Magnitudes of the frequency transformed signal are then computed (step 134) and a modal envelope is developed (step 136). The modal envelope is then filtered (step 138) and a derivative is taken to aid in the detection of modes within the envelope (step 140). For example, the derivative will equal zero at the peaks of the modal envelope. Once the modes are identified, the mean magnitude $\mu$ of each mode is located (step 142). A standard deviation $\sigma$ is then measured for each mode (step 144). When modal moment estimates for each of the modes have been computed, an adaptive limit $\alpha$ is calculated (steps 146 and 148). The modal estimates are then stored for use in interference suppression (step 150).

As described above, in one embodiment of the present invention the adaptive limit a is calculated as the sum of (1) the mean magnitude of the fundamental data signal $\mu_1$, and (2) the product of a constant k and the magnitude standard deviation $\sigma_1$ of the fundamental data signal. In one embodiment of the invention, the constant k can be changed based on various factors, such as the type of interference that is present. For example, the constant k can be changed based on an estimate of relative jammer signal strength and bandwidth in order to obtain near optimum bit error rate performance.

Before discussing interference suppression methods, an expanded description of FH and processing gain adaptation will be made. FIG. 19 is a spectrum diagram illustrating a number of bands WsN for use in frequency hopping. Although only four bands are shown, it should be appreciated that N can be virtually any number depending on the application. The bands WsN all occur within a communication system bandwidth Wt. As illustrated, each band WsN includes an interference signal. That is, band Ws1 includes a frequency selective fade 110, band Ws2 includes a partial band noise jammer 112, band Ws3 includes multiple tone jammers 114, and band Ws4 includes bauded interference 116. As described above, the frequency hop adaptation module 34 will sequence through a predetermined hop sequence during normal operation, wherein the frequency of operation of the system 10 will alternate among bands WsN. In accordance with one aspect of the present invention, a particular band can be removed from the frequency hop rotation based on the interference content within the band. For example, the system 10 can determine that effective communications cannot be carried out in band Ws2, due to the presence of the relatively powerful noise jammer 112, and Ws2 is removed from the frequency hopping sequence.

Figure 20:
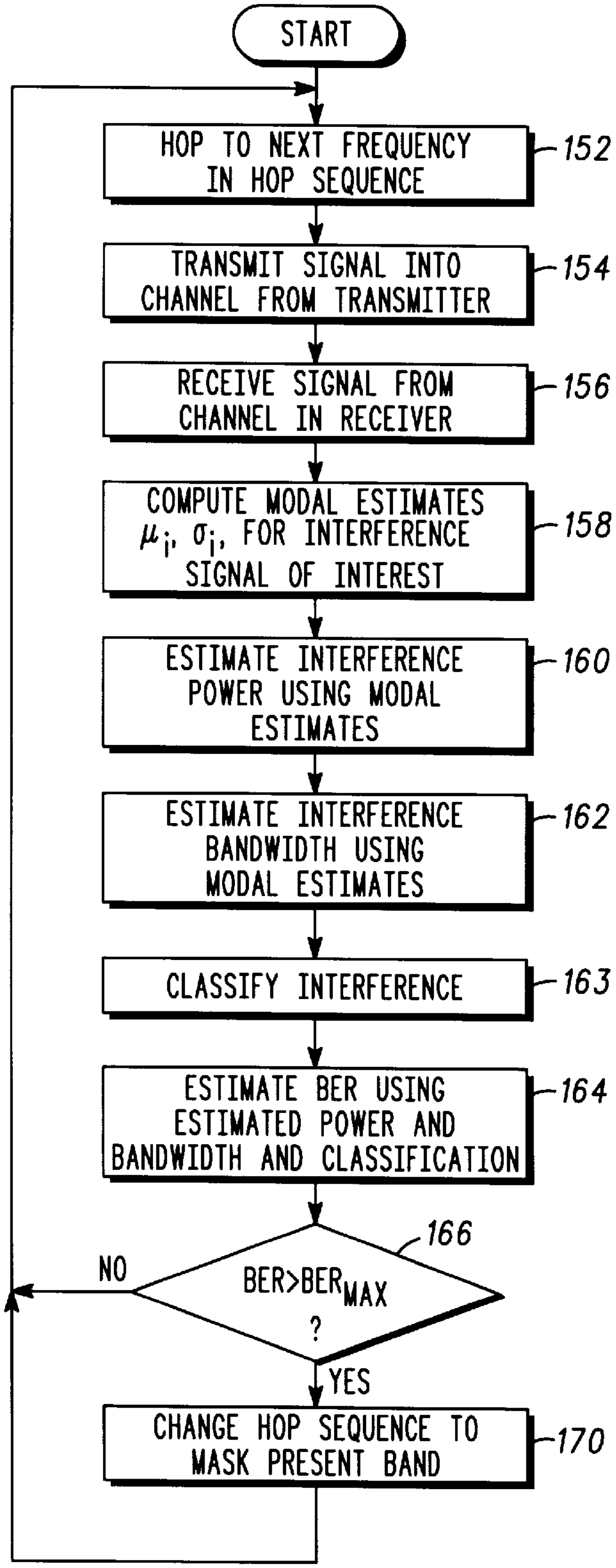
FIG. 20 is a flowchart illustrating a method for performing frequency hop masking in accordance with one embodiment of the present invention.

FIG. 20 is a flowchart illustrating one method for performing frequency hop masking. First, the transmitter 14 hops to the next frequency band in the hop sequence (step 152). The transmitter 14 then transmits a signal into the channel 16 within the new frequency band (step 154). For example, the transmitter 14 may transmit a spread spectrum signal within band Ws2 illustrated in FIG. 19. The signal is received from the channel 16 by the receiver 18 and is processed to determine interference classification (step 156). Modal estimates $\mu$ and $\sigma$ are then determined for each of the modes identified (step 158). The modal estimates are then used to determine estimates for interference power and interference bandwidth for each of the identified modes (steps 160 and 162). Next, the signal is classified (step 163). An estimate of the bit error rate that will be achieved by demodulating and decoding the receive signal without interference suppression is calculated using the estimated power and bandwidth information and the classification information (step 164). The estimated bit error rate is then compared to a maximum tolerable bit error rate $BER_{max}$ (step 166). If the BER does not exceed the maximum tolerable bit error rate, the system 10 hops to the next frequency band and the process is repeated. If the BER exceeds the maximum tolerable BER, the present hop band WsN is masked from the hop sequence so that it is no longer used by the frequency hopping adaptation module 34 (until the interference condition changes) (step 170) and the system 10 then hops to the next frequency band.

The procedure outlined in the flowchart of FIG. 20 can also be used for processing gain adaptation. That is, instead of changing the hop sequence in step 170, the processing gain parameters determined by the processing gain adaptation module 36 can be changed based on the identified interference signals. In general, new processing gain parameters will be chosen to minimize the effect of the identified interference. The decision on whether to use frequency hopping adaptation or processing gain adaptation will depend on both the type or classification, spectral location, and level of the interference identified by the disturbance classification unit 74 and the jammer parameter extraction unit 76 and the desired performance goals of the system 10. Circumstances may exist, for example, when both frequency hopping adaptation and the processing gain adaptation are performed.

In a preferred embodiment, the above-described FH/processing gain adaptation procedure is performed every time a receive signal is received from the channel 16. Alternatively, as will be described shortly, the procedure will only be performed if the selected interference suppression method does not achieve desirable results. In such an embodiment, the interference modules will access an FH/processing gain adaptation module if a predetermined performance goal (such as a predetermined BER) is not achieved. A description of the interference suppression methods of the present invention is now made.

INVERSE WHITENING FUNCTION

Figure 21:
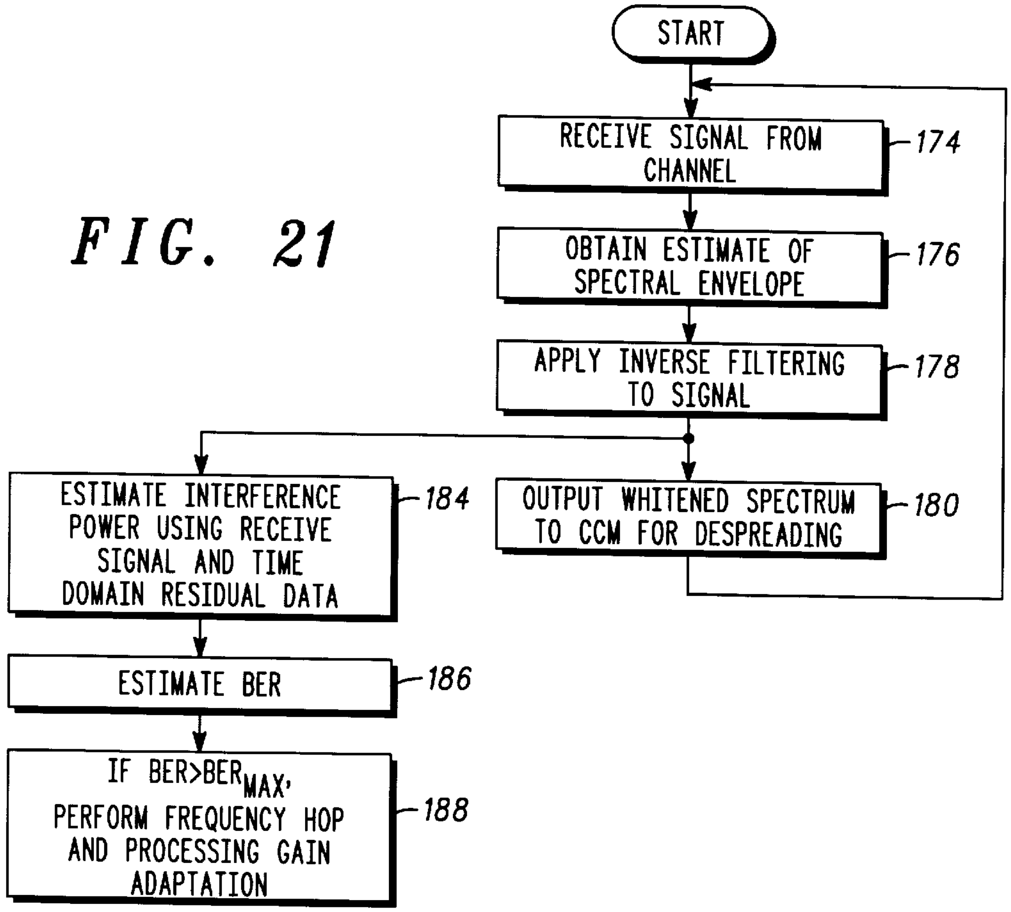
FIG. 21 is a flowchart illustrating the operation of an inverse whitening function in accordance with one embodiment of the present invention.

The inverse whitening function suppression method makes use of the fact that direct sequence spread spectrum data transmissions generally have a spectrum similar to that of band limited white noise. Based on this fact, perturbations in the channel serve to color or distort the spectral characteristic of the channel from this white noise model. The inverse whitening function removes this distortion from the white noise model. FIG. 21 is a flowchart illustrating the operation of the inverse whitening function in one embodiment of the present invention. A signal is first received from the channel 16 (step 174). An estimate of the spectral envelope of all interfering signals within the receive signal is then obtained (step 176). In order to insure that the underlying phase information is undisturbed, an all-pole spectral envelope estimate is required. In one embodiment of the present invention, the following all-pole spectral model is implemented:

$$H(Z) = \frac{1}{1 + \sum_{k=1}^{n} a_k z^{-k}} \qquad \text{Eq. 15}$$

Where $a_k$ represents the prediction coefficients for an nth order model. The prediction coefficients may exemplify the periodic state estimate that is obtained by an adaptation processor using, for example, classic auto-correlation and durbin recursion.

After the spectral envelope is estimated, the receive signal is inverse filtered using the inverse of the spectral envelope to remove the interference components (step 178). In one embodiment of the invention, the inverse whitening filter is represented by the following equation:

$$y(n) = x(n) = \sum_{k=1}^{N} a(k)x(n-k) \qquad \text{Eq. 16}$$

After whitening, the whitened spectrum is delivered to the CCM 48 to initiate despreading and demodulation as described above (step 180). The inverse whitening procedure is then repeated for the next receive signal.

If the signal having the whitened spectrum still results in a relatively high BER, the system may want to perform FH or processing gain adaptation. In this regard, the following steps are also performed. Using the time domain residual signal and the receive signal, interference power estimates are calculated (step 184). The power estimates and interference classifiction are used to estimate the BER that will be achieved (step 186). If the estimated BER exceeds a maximum BER, then frequency hop adaptation or processing gain adaptation can be performed as described above (step 188). BER estimates can also be computed using the modal approach of FIG. 20.

Figure 22:
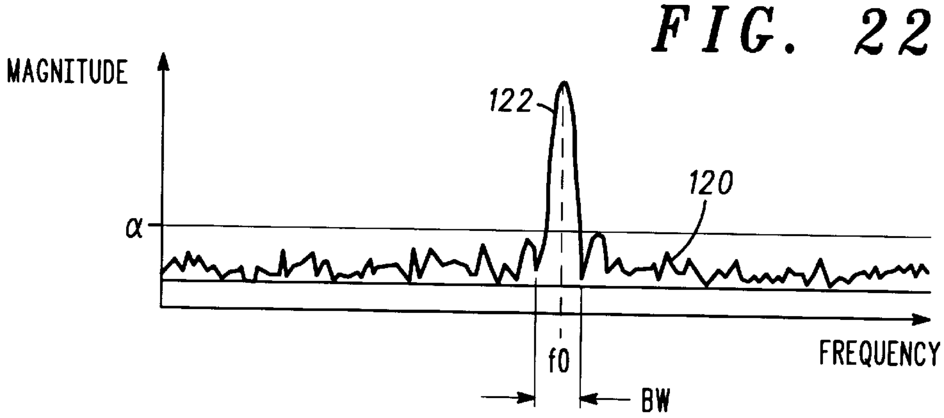
FIG. 22 is a spectrum diagram illustrating the spectrum of a spread spectrum data signal corrupted by a PSK partial band jammer 122.

In an alternate embodiment, the inverse whitening approach is applied in the frequency domain. The interfering signal is located using modal estimates and subsequenct noise floor characterization. The location of the interfering signal, the bandwidth of the signal, and the classification of the signal are used to apply an inverse filter envelope obtained from an apriori family of such envelopes. FIG. 22 is a spectrum diagram illustrating the spectrum of a spread spectrum data signal 120 corrupted by a PSK partial band jammer 122. In accordance with the invention, estimates are made of the spectral envelope of the PSK jammer 122 and an inverse matched filter estimate is derived (not shown). As illustrated in FIG. 22, the bandwidth (BW) and the center frequency (fo) of the jammer 122 are estimated, and an inverse sin(x)/x matched filter response (not shown) is generated. The receive signal is applied to the inverse matched filter to obtain the whitened output spectrum with no reduction in system throughput. The inverse whitening function interference suppression method can be used to suppress a wide range of narrowband and partialband interference types, including tones, communication signals, and jammers. In addition, the inverse whitening function method is capable of improving bit error rate performance at high interference power level to signal power level ratios. The inverse whitening function method can also be used to remove the damaging effects of frequency selective fading from the received signal.

ADAPTIVE INVERSE WEIGHT

In the adaptive inverse weight interference suppression method, the modal moment estimates are used to selectively target all spectral outliers that exceed the adaptive modal limit $\alpha$. As described earlier, the adaptive modal limit can be calculated as $\mu+k\sigma$. Only those signals that exceed this limit are affected by the anti-jam suppression. For example, with reference to FIG. 17, only those points to the right of adaptive limit $\alpha$ on the graph are affected by the interference suppression method. An inverse weight $\omega$ is applied to each of these samples that, in one embodiment, is inversely proportional to the observed deviation from $\alpha$ (i.e., inversely proportional to mag(sample)$-\alpha$). In one embodiment of the invention, the weights $\omega$ are determined by the following equation:

$$\omega=\alpha/|\alpha=(\delta-\alpha)^m| \qquad \text{Eq. 17}$$

where m is an integer.

The adaptive inverse weight method can also be applied to proximity samples surrounding each spectral outlier sample, thereby further improving performance by enhancing the attenuation of the interference envelope. That is, an inverse weighting can be applied to +/−n samples on either side of each sample that exceeds the adaptive limit $\alpha$. The adaptive inverse weight interference suppression method is effective for reducing the BER for signals containing a myriad of different interference types, including intentional hostile jammers, and bauded and non-bauded interference. Also, the adaptive inverse weight method is effective at very high jammer power to signal power ratios.

Figure 23:
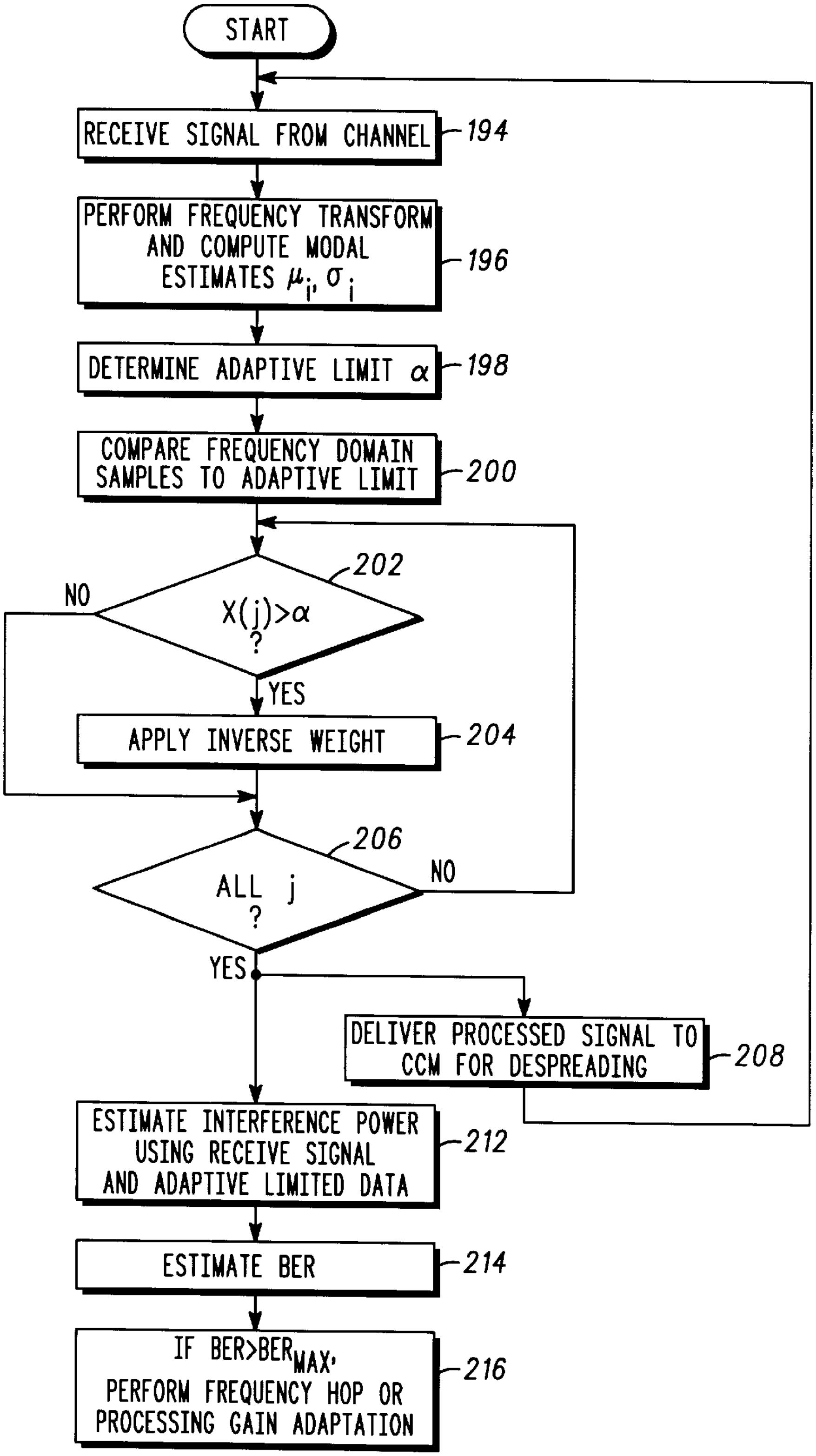
FIG. 23 is a flowchart illustrating the operation of an adaptive inverse weight interference suppression method in accordance with one embodiment of the present invention.

FIG. 23 is a flowchart illustrating the operation of the adaptive inverse weight interference suppression method. First, a signal is received from the channel 16 in the receiver 18 (step 194). The signal is then frequency transformed to achieve a frequency domain representation and modal estimates $\mu,\sigma$ are computed for each of the identified modes (step 196). Next, an adaptive limit a is calculated using the modal estimates of the fundamental data signal (step 198). Each of the samples from the frequency domain information is then compared to the adaptive limit $\alpha$ (step 200). If the magnitude of a spectrum sample is greater than the adaptive limit, an inverse weight filter is applied to that sample (and optionally to proximity samples) as described above (steps 202 and 204). When all of the samples have been processed, the filtered signal is delivered to the CCM 48 to initiate despreading and demodulation (steps 206 and 208). Processing is then initiated for the next received signal.

To determine whether to perform FH or processing gain adaptation, interference power is estimated using the received signal and the adaptive limited data (step 212). The BER is estimated (step 214) and, if the BER is greater than a maximum value, frequency hopping or processing gain adaptation is performed (step 216).

Using the adaptive inverse weight interference suppression method, improved signal fidelity is obtained without sacrificing throughput. In general, the interference is suppressed without significant distortion of the underlying spread spectrum data.

ADAPTIVE EXCISION

In the adaptive excision method, the modal moment estimates are used to locate and characterize the interference signal components. An estimate of jammer signal bandwidth is then used to excise (i.e., remove) a portion of the signal spectrum from the receive signal, including both interferer and signal. Unlike the adaptive inverse weight method, the adaptive excision method removes a portion of the spread spectrum signal spectrum from below the adaptive limit $\alpha$. Consequently, the adaptive excision method does not achieve the bit error rate reductions that the adaptive inverse weight method is capable of. However, the adaptive excision method is simpler to implement than the adaptive inverse weight method.

In one embodiment, a filter response modeling an ideal notch filter is used to remove the portion of the spectrum occupied by the interfering signal or signals. Other filter configurations, such as sinusoidal rolloff functions, can alternatively be used to minimize adverse affects during reverse frequency transformation caused by sharp spectral edges. As with the other methods, the adaptive excision method improves signal fidelity without sacrificing bandwidth.

Figure 24:
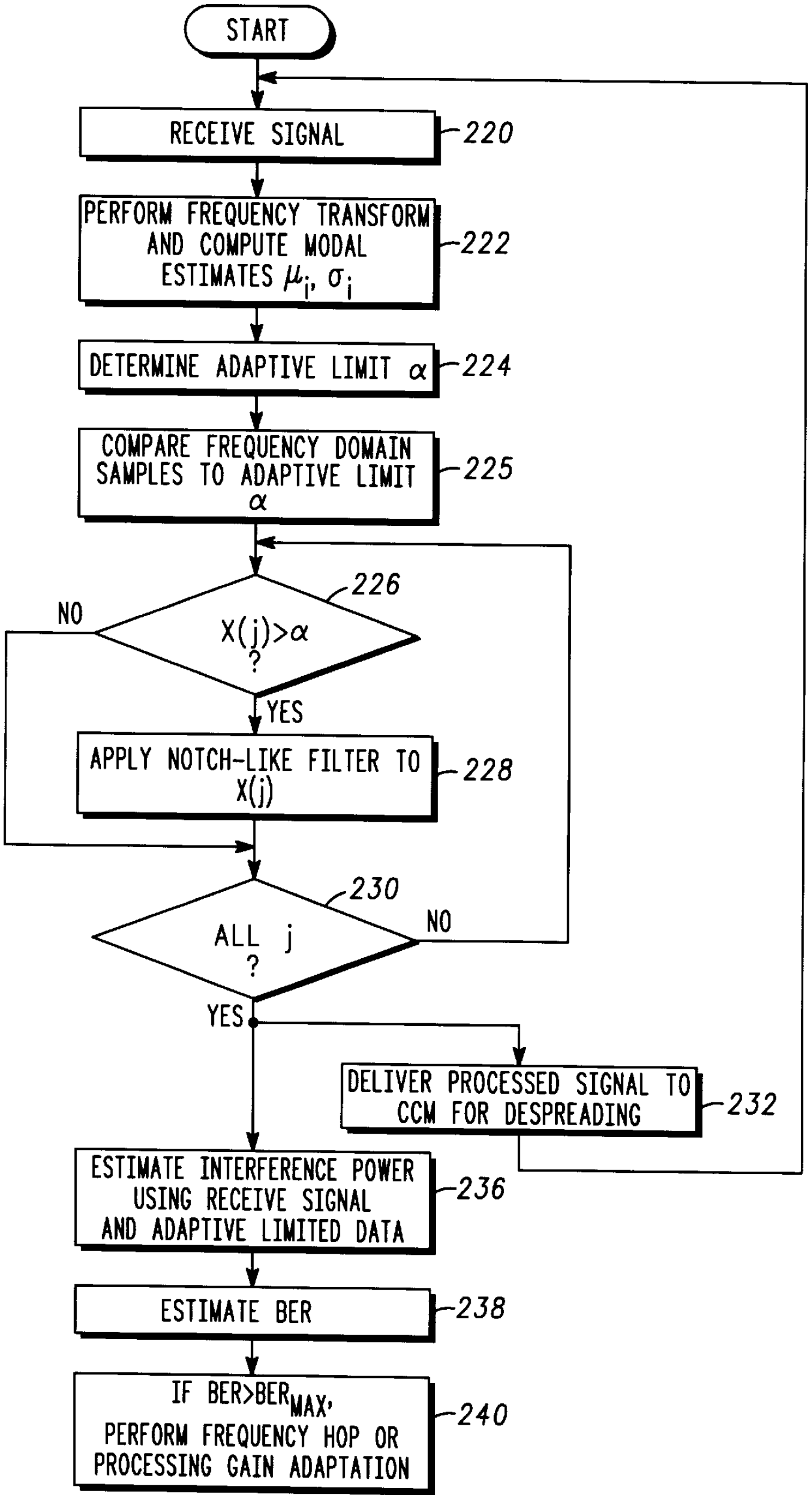
FIG. 24 is a flowchart illustrating the operation of an adaptive excision interference suppression method in accordance with one embodiment of the present invention.

FIG. 24 is a flowchart illustrating one embodiment of the adaptive excision interference suppression method. A signal is first received from the channel 16 (step 220) and the signal is processed to compute the modal estimates $\mu$, $\sigma$ (step 222). The adaptive limit a is then calculated using the modal estimates for the fundamental data signal (step 224). The frequency domain signal samples are then each compared to the adaptive limit $\alpha$ (step 225). If the magnitude of a sample is greater than $\alpha$, a notch like filter response is applied to the sample (steps 226 and 228). Once all of the frequency domain samples have been processed, the frequency domain information is delivered to the CCM 48 to initiate despreading and demodulation of the data (step 230 and 232). As with the other methods, processing is also performed to determine whether frequency hop or processing gain adaptation is to be performed (steps 234–240).

Figure 25:
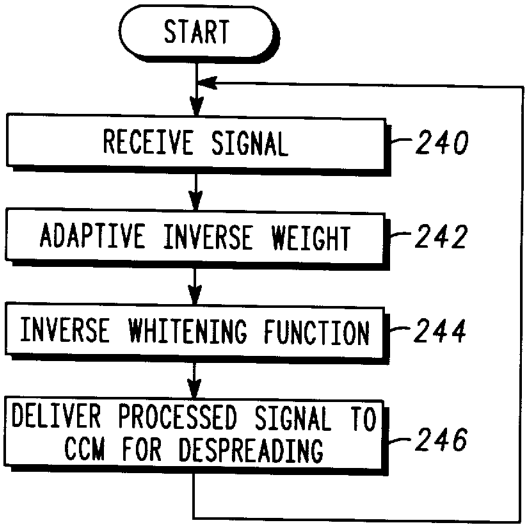
FIG. 25 is a flowchart illustrating a cascaded interference suppression procedure in accordance with one embodiment of the present invention.

As described previously, each of the above described interference suppression methods can be implemented in the targeted interference suppression unit 78. In addition, other interference suppression methods, such as prior art methods, can be implemented in the targeted interference suppression unit 78. The unit 78 will determine which method to use based upon the type or types of interference detected in the disturbance classification unit 74 and the jammer parameter extraction unit 76. It should be appreciated that it is also possible to cascade suppression methods in accordance with the present invention. That is, two or more suppression methods can be implemented in the targeted interference suppression unit 78 if it is determined that this is the best way to mitigate interference. FIG. 25 is a flowchart illustrating one such cascaded interference suppression procedure. The signal is received from the channel 16 in the receiver 18 (step 240). An adaptive inverse weight method is applied to the receive signal to remove one type of detected interference from the signal (step 242). An inverse whitening function is then applied to the receive signal to remove another type of interference from the signal (step 244). After the cascaded processing is complete, the restored signal is delivered to the CCM 48 to initiate despreading and demodulation (step 246). Processing of the next received signal is then initiated.

Figure 26:
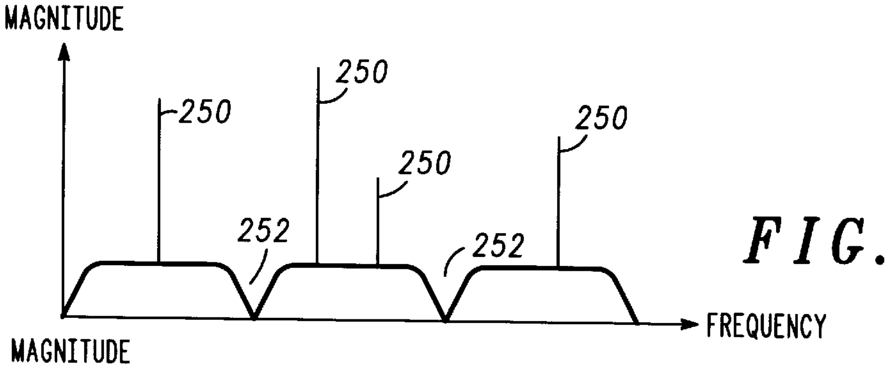
FIGS. 26–28 are spectrum diagrams illustrating a cascaded suppression procedure in accordance with one embodiment of the present invention.
Figure 27:
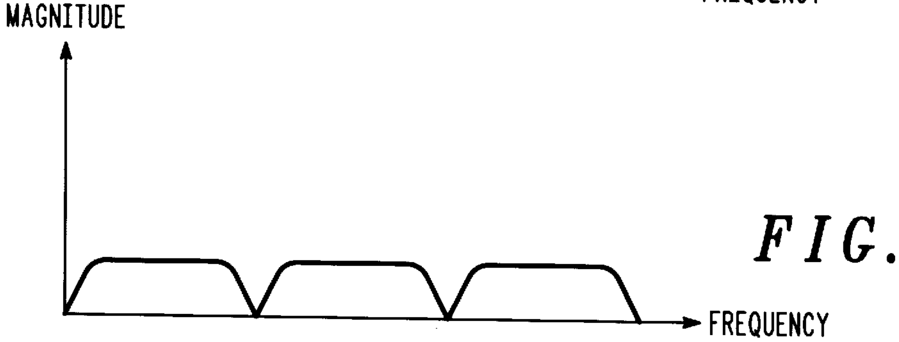
Figure 28:
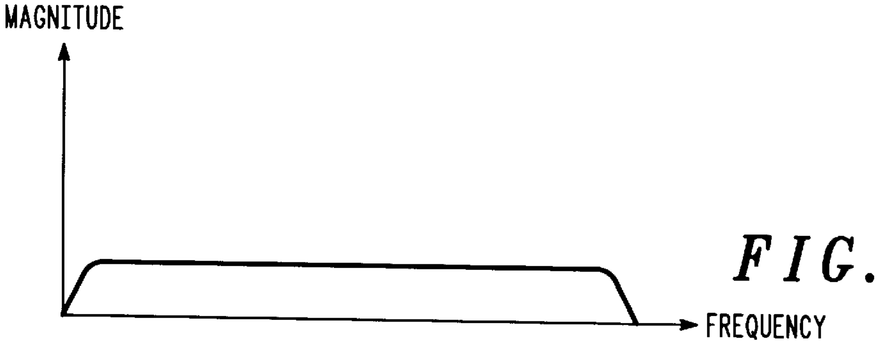

FIGS. 26–28 are spectrum diagrams illustrating a cascaded suppression procedure. FIG. 26 represents a received signal after being transformed to a frequency domain representation. As illustrated, the received signal includes both narrow band jammers 250 and frequency selective fading 252. Adaptive inverse weighting is first applied to remove the narrow band jammers 250 and the spectrum of FIG. 27 results. An inverse whitening function is then applied to the signal to remove the frequency selective fading 252 and the spectrum of FIG. 28 results. Virtually any combination of interference suppression methods can be implemented in the targeted interference suppression unit 78 in accordance with the present invention.

The principles of the present invention can be used in a wide range of applications, such as commercial paging, commercial cellular and PCS, spread spectrum wireless LAN, satellite uplink/crosslink/downlink, small unit operations, digital battlefield, code division multiple access (CDMA), and others. In one embodiment, the invention is implemented in full duplex, handheld communicators in a mobile communications system. In another embodiment, the invention is used in a spread spectrum PCS system which is overlaid on existing commercial/military narrowband systems to provide simultaneous frequency reuse. In a further embodiment, the invention is used in a spread spectrum digital paging system which is overlaid on existing commercial/military narrowband systems. Other applications are also possible.

It should be appreciated that the interference suppressor 316 of the present invention can be used without the interference classifier 314. That is, criteria other than precise interference type can be used to determine which of the interference suppression methods within the interference suppressor 316 should be used to perform suppression.

What is claimed is:

1. A receiver unit for use in a communications system that is operative in a predetermined frequency band, comprising:

a signal receptor for receiving a signal from a communications channel;

an interference classifier for classifying an interference component within said signal, wherein said interference classifier classifies said interference component according to a plurality of interference types, and said interference classifier outputting a signal indicative of classification of each of said interference types; and an interference suppressor for suppressing said interference component by selecting one of a plurality of suppression methods best suited to suppress said signal based on the indication signal of classification of said interference type.

2. A receiver unit, as claimed in claim 1, wherein:

said interference suppressor includes means for selecting from a plurality of interference suppression methods best suited to suppress said interference type, based on interference type.

3. A receiver unit as claimed in claim 1, wherein said interference suppressor includes:

a plurality of interference suppression modules for use in suppressing interference in said signal; and means for selecting at least one of said interference suppression modules best suited to suppress said interference type, based on interference type.

4. A receiver unit, as claimed in claim 3, wherein:

said interference suppression modules are each optimized for use with predetermined interference types.

5. A receiver unit, as claimed in claim 3, wherein:

said means for selecting includes means for selecting multiple interference modules based on multiple interference components in said signal, wherein said interference suppressor cascades said multiple interference modules to process said signal.

6. A receiver unit, as claimed in claim 1, wherein:

said interference classifier includes at least one of the following: a multi-layer perceptron classifier and a decision tree classifier.

7. A receiver unit, as claimed in claim 1, wherein:

said interference classifier includes means for extracting parameters relating to said interference component from said signal.

8. A receiver unit, as claimed in claim 7, wherein:

said means for extracting parameters includes a means for determining at least one feature parameter transformation for said interference component.

9. A receiver unit, as claimed in claim 8, wherein:

said means for determining at least one feature parameter transformation includes means for receiving input in-phase signal samples x(i) and quadrature signal samples y(i) and for processing the samples according to the following transformation equations:

$$px(j)=y(i+\tau)[y(i)-x(i)]+x(i+\tau)[x(i)+y(i)]$$

$$py(j)=x(i+\tau)[x(i)-y(i)]+y(i+\tau)[y(i)+x(i)]$$

where px(j) and py(j) are the in-phase and quadrature transformations, respectively; τ=delay, in samples; i=1 to N; and j=1 to N−τ.

10. A receiver unit, as claimed in claim 8, wherein:

said means for determining at least one feature parameter transformation includes means for generating a histogram.

11. A receiver unit, as claimed in claim 8, wherein:

said means for determining at least one feature parameter transformation includes means for performing a polar to Cartesian transformation.

12. A receiver unit, as claimed in claim 8, wherein:

said means for determining at least one feature parameter transformation includes means for performing a histogram magnitude projection.

13. A receiver unit, as claimed in claim 8, wherein:

said means for determining at least one feature parameter transformation includes means for performing a histogram phase/frequency projection.

14. A receiver unit, as claimed in claim 7, wherein:

said interference classifier includes a memory means for storing parameters for known interference types, said stored parameters being for comparison with parameters extracted from said signal.

15. A receiver unit, as claimed in claim 1, wherein:

said interference classifier includes a co-processor for performing complex arithmetic operations.

16. A receiver unit, as claimed in claim 1, further comprising:

a performance estimator for determining at least one performance metric relating to the performance of said communications system and feedback means for delivering said at least one performance metric to said interference suppressor for use in fine tuning the interference suppressor.

17. A receiver unit, as claimed in claim 1, wherein:

said communications system is a spread spectrum personal communications system (PCS) that overlays a narrowband/partialband communications system.

18. A receiver unit, as claimed in claim 1, wherein:

said communications system is a spread spectrum paging system that overlays a narrowband/partialband communications system.

19. A receiver unit, as claimed in claim 1, wherein:

said communications system is a wireless LAN system that overlays a narrowband/partialband communications system.

20. A receiver unit, as claimed in claim 1, wherein:

said receiver unit is part of a handheld transceiver capable of duplex operation.

21. A receiver unit, as claimed in claim 1, wherein:

said interference classifier includes means for improving the signal to noise ratio (SNR) of said signal before classification is performed.

22. A receiver unit, as claimed in claim 21, wherein:

said means for improving SNR includes preclassification filtering means for use in separating an interference component from said signal.

23. A receiver unit, as claimed in claim 21, wherein:

said means for improving SNR includes a phase domain filter.

24. A receiver unit, as claimed in claim 23, wherein:

said phase domain filter is for use in separating a plurality of interference components.

25. A receiver unit, as claimed in claim 23, wherein:

said phase domain filter comprises a moving average.

26. A method for reducing interference components in a received signal in a communications system, comprising the steps of:

receiving a signal from a channel;

classifying at least one interference component in said signal according to interference type; and performing interference suppression on said signal to reduce the level of said interference component within said signal, said performing step including selecting an interference suppression method from a plurality of interference suppression methods based on interference type.

27. The method, as claimed in claim 26, wherein:

said classifying step includes extracting parameters from said signal relating to said interference component.

28. The method, as claimed in claim 26, wherein:

said classifying step includes seperating said interference components from a plurality of interference components.

29. The method, as claimed in claim 26, wherein:

said plurality of interference suppression methods includes an adaptive excision method including the following steps:

obtaining a frequency domain representation of said signal;

determining a frequency location of said interference component with respect to said frequency domain representation; and removing a portion of said frequency domain representation of said signal based on said frequency location of said interference component.

30. The method, as claimed in claim 29, wherein:

said removing step includes applying a band-reject filter to said frequency domain representation.

31. The method, as claimed in claim 26, wherein:

said plurality of interference suppression methods includes an inverse weight method including the following steps:

obtaining a frequency domain representation of said signal;

determining portions of said frequency domain representation that exceed a limit value; and reducing said portions in magnitude using an inverse weighting function.

32. The method, as claimed in claim 31, wherein:

said inverse weighting function is inversely proportional to the difference between a magnitude of said portions and said predetermined limit value.

33. The method, as claimed in claim 32, further comprising the step of:

adaptively adjusting said limit value based on a predetermined criterion.

34. The method, as claimed in claim 33, wherein:

said predetermined criterion includes a signal strength estimate for said interference component.

35. The method, as claimed in claim 33, wherein:

said predetermined criterion includes a standard deviation estimate for said interference component.

36. The method, as claimed in claim 33, wherein:

said predetermined criterion includes a bandwidth estimate for said interference component.

37. The method, as claimed in claim 26, wherein:

said plurality of interference suppression methods includes an inverse whitening method including the following steps:

obtaining a frequency domain representation of said signal;

determining a spectral envelope of said interference component using said frequency domain representation;

generating an inverse envelope function using said spectral envelope; and applying said inverse envelope function to said frequency domain representation of said signal to reduce said interference component in said signal.

38. The method, as claimed in claim 26, wherein:

said plurality of interference suppression methods includes an inverse whitening method including the following steps:

determining a spectral envelope using time domain samples of said signal;

generating an inverse envelope function using said spectral envelope; and applying said inverse envelope function to said time domain samples.

39. A communications system having hybrid interference mitigation, said system comprising:

means for receiving a signal from a channel;

means for classifying at least one interference component within said signal according to interference type , and said interference classifier outputting a signal indicative of classification of each of said interference types;

means for suppressing said at least one interference component by selecting one of a plurality of suppression methods best suited to suppress said signal based on the indication signal of classification of said interference type; and adaptation means including at least one of the following:

means for performing frequency hopping adaptation by updating a frequency hopping sequence in response to said means for classifying; and means for performing processing gain adaptation by updating the processing gain of a transmit signal in response to said means for classifying.

40. The communications system, as claimed in claim 39, wherein:

said adaptation means includes both means for performing frequency hopping adaptation and means for performing processing gain adaptation.

41. The communications system, as claimed in claim 39, wherein:

said adaptation means is enabled when an output signal of said means for suppressing fails to achieve a predetermined performance goal.

42. The communications system, as claimed in claim 41, wherein:

said predetermined performance goal includes a bit error rate (BER) being less than a predetermined value.

* * * * *